United States Patent [19]

Keogh et al.

[11] 4,260,725

[45] Apr. 7, 1981

[54] HYDROPHILIC CONTACT LENS MADE FROM POLYSILOXANES WHICH ARE THERMALLY BONDED TO POLYMERIZABLE GROUPS AND WHICH CONTAIN HYDROPHILIC SIDECHAINS

[75] Inventors: Philip L. Keogh, Pittsford; Jay F. Kunzler, Canadaigua, both of N.Y.; Gregory C. C. Niu, Lexington, Mass.

[73] Assignee: Bausch & Lomb Incorporated, Rochester, N.Y.

[21] Appl. No.: 102,009

[22] Filed: Dec. 10, 1979

[51] Int. Cl.$^3$ .............................................. C08F 30/08
[52] U.S. Cl. ..................................... 526/279; 264/1.1; 525/419; 525/479; 526/75; 528/25; 528/26; 528/28; 528/32; 528/33; 528/35; 528/37; 351/160 H; 351/160 R
[58] Field of Search ............... 351/160 H, 160 R; 528/33, 35, 25, 26, 28, 37, 32; 526/279, 75; 264/1, 2; 525/419, 479

[56] References Cited

U.S. PATENT DOCUMENTS

| | | | |
|---|---|---|---|
| Re. 25,727 | 2/1965 | Haluska | 260/448.2 |
| 2,723,987 | 11/1955 | Speier | 260/448.2 |
| 2,762,823 | 9/1956 | Speier | 260/448.2 |
| 2,770,631 | 11/1956 | Merker | 260/448.2 |
| 2,770,632 | 11/1956 | Merker | 260/448.2 |
| 2,770,633 | 11/1956 | Sommer | 260/448.2 |
| 2,793,223 | 5/1957 | Merker | 260/448.2 |
| 2,819,245 | 1/1958 | Shorr | 260/42 |
| 2,823,195 | 2/1958 | Shorr et al. | 260/42 |
| 2,823,218 | 2/1958 | Speier et al. | 260/448.2 |
| 2,838,423 | 6/1958 | Gilkey | 260/46.5 |
| 2,842,517 | 7/1958 | Shorr | 260/45.4 |
| 2,855,381 | 10/1958 | Sommer | 260/46.5 |
| 2,865,885 | 12/1958 | de Benneville et al. | 260/46.5 |
| 2,894,967 | 7/1959 | Gilkey | 260/438 |
| 2,906,735 | 9/1959 | Speier | 260/46.5 |
| 2,922,807 | 1/1960 | Merker | 260/448.2 |
| 2,924,587 | 2/1960 | Shorr | 260/46.5 |
| 2,924,588 | 2/1960 | Speier | 260/46.5 |
| 2,925,402 | 2/1960 | Speier | 260/46.5 |
| 2,928,858 | 3/1960 | Morehouse et al. | 260/448.8 |
| 2,929,829 | 3/1960 | Morehouse | 260/448.2 |
| 2,971,864 | 2/1961 | Speier | 117/124 |
| 2,989,559 | 6/1961 | Marsden | 260/448.2 |
| 3,033,815 | 5/1962 | Pike | 260/46.5 |
| 3,057,901 | 10/1962 | Pleuddemann | 260/448.2 |
| 3,071,561 | 1/1963 | Bluestein | 260/46.5 |
| 3,152,161 | 10/1964 | Lisanke et al. | 260/448.2 |
| 3,215,643 | 11/1965 | Pail | 252/364 |
| 3,215,718 | 11/1965 | Ryan | 260/448.2 |
| 3,228,741 | 1/1966 | Becker | 351/160 |
| 3,246,048 | 4/1966 | Haluska | 260/824 |
| 3,249,586 | 5/1966 | Haluska | 260/46.5 |
| 3,302,577 | 5/1967 | Morehouse | 260/448.2 |
| 3,317,460 | 5/1967 | Clark et al. | 260/46.5 |
| 3,317,577 | 5/1967 | Ryan | 260/448.2 |
| 3,328,449 | 6/1967 | Haluska | 260/448.2 |
| 3,338,943 | 8/1967 | Speier | 260/448.2 |
| 3,355,425 | 11/1967 | Haluska | 260/46.5 |
| 3,355,455 | 11/1967 | Haluska | 260/297 |
| 3,398,104 | 8/1968 | Haluska | 260/2.5 |
| 3,402,192 | 9/1968 | Haluska | 260/448.2 |
| 3,440,261 | 4/1969 | Saam | 260/448.2 |
| 3,458,553 | 7/1969 | Niederprum et al. | 260/448.2 |
| 3,508,959 | 4/1970 | Krahuke | 117/138.8 |
| 3,518,288 | 6/1970 | Haluska | 260/448.2 |
| 3,519,915 | 5/1970 | Speier | 8/8 |
| 3,560,543 | 2/1971 | Plueddemann | 260/448.2 |
| 3,560,544 | 2/1971 | Haluska | 260/448.2 |
| 3,586,699 | 6/1971 | Wu | 260/326.5 |
| 3,598,785 | 8/1971 | Holub | 260/46.5 |
| 3,627,806 | 12/1971 | Le Grow | 260/448.2 |
| 3,658,867 | 4/1962 | Prokai | 260/448.2 N |
| 3,660,452 | 5/1972 | Morehouse | 260/448.2 N |
| 3,700,573 | 10/1972 | Laizier et al. | 204/159.13 |
| 3,700,713 | 10/1972 | Atherton et al. | 260/448.2 N |
| 3,703,486 | 11/1972 | Keil | 260/2.5 |
| 3,729,444 | 4/1973 | Bey | 260/46.5 |
| 3,734,763 | 5/1973 | Pleuddemann | 117/72 |
| 3,737,336 | 6/1973 | Golitz et al. | 117/75 |
| 3,763,081 | 10/1973 | Holub et al. | 260/37 SB |
| 3,808,178 | 4/1974 | Gaylord | 260/86.1 |
| 3,836,559 | 9/1974 | Prokai | 260/448.2 N |
| 3,843,529 | 10/1974 | Bertrand | 252/30 |
| 3,846,329 | 11/1974 | Householder et al. | 252/358 |
| 3,878,168 | 4/1975 | Schank | 260/46.5 E |
| 3,884,860 | 5/1975 | Brown | 260/29.2 M |
| 3,916,033 | 10/1975 | Merrill | 427/36 |
| 3,993,606 | 11/1976 | Von Bonin et al. | 260/2.5 |
| 4,018,723 | 4/1977 | Kanner | 260/2.5 |
| 4,049,674 | 9/1977 | Kanner | 260/332.1 |
| 4,049,675 | 9/1977 | Kanner | 260/332.1 |
| 4,049,676 | 9/1977 | Schilling, Jr. | 260/332.1 |
| 4,136,250 | 1/1979 | Mueller et al. | 528/29 |
| 4,138,382 | 2/1979 | Polmanteer | 260/29.6 TA |
| 4,153,641 | 5/1979 | Deichert et al. | 260/827 |
| 4,189,546 | 2/1980 | Deichert et al. | 526/279 |

FOREIGN PATENT DOCUMENTS 7704136 4/1977 Netherlands.

OTHER PUBLICATIONS

Piccoli et al., Journal of the American Chemical Society, vol. 82, pp. 1883–1885, Apr. 1960.

*Primary Examiner*—Melvyn I. Marquis
*Attorney, Agent, or Firm*—Robert M. Phipps; Frank C. Parker

[57] ABSTRACT

A water absorbing, soft, hydrophilic, flexible, hydrolytically stable, biologically inert contact lens with the capability of transporting oxygen sufficiently to meet the requirements of the human cornea comprising a polysiloxane which is $\alpha,\omega$ terminally bonded through divalent hydrocarbon groups to polymerizably activated unsaturated groups and which contain hydrophilic sidechains is disclosed.

29 Claims, No Drawings

HYDROPHILIC CONTACT LENS MADE FROM POLYSILOXANES WHICH ARE THERMALLY BONDED TO POLYMERIZABLE GROUPS AND WHICH CONTAIN HYDROPHILIC SIDECHAINS

BACKGROUND OF THE INVENTION

1. Field of the Invention

This invention relates to a novel polysiloxane water absorbing contact lens. These contact lenses are water absorbing, soft, hydrophilic, flexible, hydrolytically stable and biologically inert. The contact lens are prepared from the polymerization of hydrophilic sidechains containing polysiloxane monomers. The polysiloxane monomers are α,ω terminally bonded through divalent hydrocarbon groups to polymerizably activated unsaturated groups. These monomers are polymerized to form polymers in a crosslinked network. The polymers and/or copolymers are preferably optically clear and colorless. The polymers and copolymers described herein may be employed for making "hard" or "soft" contact lenses, intraocular implants, as well as other prostheses, more particularly "soft" contact lenses which are water absorbing and hydrophilic.

2. Prior Art Statement

U.S. Pat. No. 4,153,641 teaches contact lenses made from polymers and copolymers comprising poly(organosiloxane) polymers and copolymers formed by polymerizing a poly(organosiloxane) monomer α,ω terminally bonded through divalent hydrocarbon groups to polymerized, free radical polymerizably activated, unsaturated groups forming a polymer in a crosslinked network. Additionally, specific comonomers are disclosed which include lower esters of acrylic and methyacrylic acid, styryls and N-vinyl pyrrolidinone which may be copolymerized with the above described poly(organosiloxane) monomer to form a copolymer. The preferred polysiloxane monomers of the instant invention include the same poly(organosiloxane) monomers described above, with the important exception, that the instant polysiloxane monomers additionally contain hydrophilic sidechains. These sidechains result in the polymer formed, being not only hydrophilic, but most importantly water absorbing. Therefore, it was unexpectedly discovered that when the instant polysiloxane monomers, described above, contained hydrophilic sidechains and were polymerized, a water absorbing polysiloxane polymer was formed. This polymer was extremely suitable for making hydrophilic, water absorbing, soft contact lenses. It is generally known in the siloxane art that siloxanes are hydrohobic. There are a few instances where the art teaches hydrophilic polysiloxanes. We know of only one instance, in the prior art, where a polysiloxane is disclosed as being capable of absorbing water. However, this known material as disclosed in U.S. Pat. No. 4,136,250 would not be suitable for making the instant contact lens for the reasons stated herein concerning U.S. Pat. No. 4,136,250 as prior art.

U.S. Pat. No. 4,136,250 teaches in pertinent part, a water absorbing polysiloxane which may be used to make soft contact lenses which is obtained by copolymerizing the following siloxane monomer:

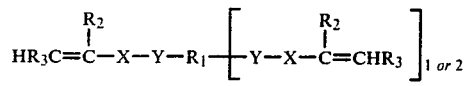

in which $R_1$ can be

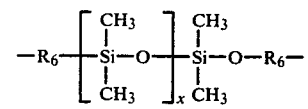

with a variety of hydrophilic monomers including acrylic acid. The above siloxane monomers can be reduced to a formula similar to but yet critically different from the instant hydrophilic sidechain containing polyorganosiloxane monomers. From the pertinent teachings of U.S. Pat. No. 4,136,250 the following siloxane monomer may be derived:

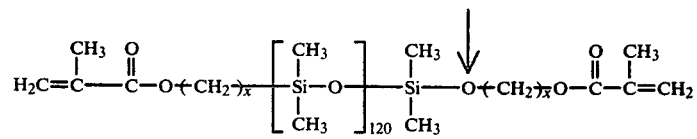

The oxygen atom in the monomer backbone, with the arrow pointing to it, is present in the '250 formula but not present in the instant hydrophilic sidechain containing polyorganosiloxane monomers. This oxygen atom presents several problems. This particular oxygen atom, because of its placement between the silicone and carbon atoms, is subject to hydrolysis and alcoholysis. This bond will hydrolyze, even at room temperature, in the presence of water. Stability is important, if this material is to be used for biomedical devices, such as, contact lenses, since these types of devices are usually heated in water in order to disinfect them. If, during disinfecting the contact lens loses its shape, then it loses its optics. This means that the material taught in '250 would be undesirable for use in certain medical devices including contact lenses. The instant hydrophilic sidechain containing polyorganosiloxane monomers results in polymers and copolymers which have superior hydrolytic stability since there is no Si—O—C linkage.

Also to be considered are the examples of '250. Only in these examples of '250 are there specific monomers disclosed without this undesirable Si—O—C linkage. However, these specific monomers have undesirable urethane linkages or couplings which present structures which are even more different from the instant monomers. The urethane linkage, i.e.,

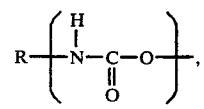

as mentioned, is also undesirable for use in medical devices, particularly contact lenses. However, in addition, the instant hydrophilic sidechain containing polyorganosiloxane monomers have no urethane linkages.

U.S. Pat. No. 4,138,382 teaches, in pertinent part, a hydrophilic, water swellable, crosslinked copolymer gel. This copolymer gel is a hydrogel, such as N-vinyl-pyrrolidone crosslinked with a low molecular weight siloxane. The siloxane component is a very small constituent and is present for the purpose of crosslinking. The siloxane is not present in amounts more than about 2 percent by weight. This does not teach a hydrophilic, water absorbing siloxane, much less a contact lens made therefrom.

Dutch Pat. No. 7,704,136 published Oct. 18, 1977 teaches, in pertinent part, a wettable siloxane material for use in making contact lenses. However, '136 teaches that the wettable contact lenses should not absorb water since water absorption, as taught in '136, would cause water to be discharged into the eye when the contact lenses are in use. This is viewed as a disadvantage in '136. The instant invention concerns a hydrophilic sidechain containing polysiloxane contact lens which absorbs water in larger amounts. Water absorption is viewed by the instant inventors as an advantage. The Dutch reference '136 further teaches that a lens should not absorb water since, as taught in '136, such a lens would undergo changes, such as, changing its optical properties. '136 further teaches that the handling of such a lens is difficult because, when it is swellable, it is physically weak. However, the instant lenses are made from hydrophilic sidechain containing polysiloxane material which is strong, durable, water absorbing and oxygen permeable. The Dutch patent further refers to some of the monomers which may be reacted with the polysiloxanes taught in '136 which are esters of glycidyl alcohol and esters of certain acids including acrylic acid and methacrylic acid. '136 also suggest the use of specific anhydrides such as maleic anhydride. Nowhere does this Dutch reference '136 disclose the instant hydrophilic sidechain containing polysiloxanes or that certain comonomers may be reacted with these monomeric hydrophilic sidechain containing siloxanes in order to form the instant water absorbing polymers or copolymers as disclosed herein.

U.S. Pat. No. 3,808,178 discloses, in pertinent part, a polymeric material containing a polymethacrylate backbone with relatively short poly(organosiloxane) ester sidechains on the backbone polymer. There is no crosslinking involved in '178 since the monomers disclosed in '178 are monofunctional, i.e., have only one functional group on each monomer. In order to get crosslinking in '178 it is taught at column 5 of '178 that different monomers must be added for crosslinking which have more than one functionality. However, in the instant invention crosslinking is obtained since each hydrophilic sidechain containing siloxane monomer is difunctional, i.e., each hydrophilic sidechain containing siloxane monomer contains two $\alpha, \omega$ functional groups, most preferably two methacrylate groups which results in crosslinking. Not only does '178 not teach the hydrophilic sidechain containing polysiloxane monomers used in the instant invention but '178 does not remotely teach making the instant hydrophilic siloxanes which are also water absorbing into soft, hydrophilic, water absorbing contact lens.

W. A. Piccoli, G. G. Haberland and R. L. Merker, J. Am. Chem. Soc., "Highly Strained Cyclic Paraffin-Siloxanes", vol. 82, pp. 1883-1885 (Apr. 20, 1960) teaches, in pertinent part, the preparation of the cyclic paraffin-siloxane monomers which may be used in the instant invention to make the instant preferred siloxane prepolymers but not siloxane prepolymers which contain hydrophilic sidechains. These preferred hydrophilic sidechain containing siloxane prepolymers, i.e., linear monomers, in the instant invention are then polymerized and crosslinked to form the preferred polymers used for making contact lenses. It is disclosed on pg. 1884, col. 2, lines 15-27, of the above article that these cyclic paraffin-siloxane monomers may be polymerized using strong acids or bases to form linear polymers. The preferred hydrophilic sidechain containing siloxane linear polymers, as mentioned, are used in the instant invention as preferred prepolymers are polymerized and crosslinked to form materials for making contact lenses. Nowhere does the article disclose or suggest the crosslinked water absorbing hydrophilic sidechain containing polysiloxane polymers of the instant invention.

U.S. Pat. No. 2,770,633 discloses 1,3-bis(4-methacryloxybutyl) tetramethyl disiloxane, one of the preferred siloxane monomers, without the instant hydrophilic sidechains, used in the instant invention. This is taught at col. 1, line 63 of '663 when R equals vinyl. However, '633 teaches only the siloxane monomer whereas the instant invention teaches not only the siloxane monomers but the hydrophilic sidechains must be attached to these monomers and then polymerized or copolymerized in order to form a hydrophilic, water absorbing hydrophilic sidechain containing polysiloxane material for use in making soft contact lenses. '633 would not want the monomer disclosed in '633 to polymerize since it would not perform its intended function as a lubricant, if polymerized.

U.S. Pat. No. 2,906,735 teaches a reaction between an alkyl siloxane and acrylic acid or a methacrylic acid resulting in a disiloxane terminated by acrylate groups. '735 does not teach the water absorbing hydrophilic sidechain containing polymers of the instant invention.

U.S. Pat. No. 2,922,807 discloses disiloxanes having acryloxy or methacryloxy groups attached to the silicone through a divalent alkylene radical of from 2 to 4 carbon atoms. '807 does not teach the water absorbing hydrophilic sidechain containing polymers of the instant invention, much less, contact lens made therefrom.

U.S. Pat. No. 3,763,081 dicloses, in pertinent part, the polymerization of an unsaturated siloxane, which is somewhat difficult to polymerize, since a double bond in this type of monomer generally is not very active. One must use both high temperatures and a peroxide catalyst or a platinum catalyst in order to complete this type of reaction. See, for example, '081 at col. 4, lines 35-46. In the instant preferred reaction the monomeric material is referred to specifically as having activated unsaturated groups bonded through a divalent hydrocarbon group to the siloxane whereas '081 has no activated unsaturated groups bonded to the siloxane. Furthermore, '081 does not teach the water absorbing hydrophilic sidechain containing polymers of the instant invention, much less, contact lens made therefrom.

U.S. Pat. No. 2,865,885, in pertinent part, teaches a vinyl group which is not activated as shown in col. 1, lines 25-30 of '885. The reason '885's double bond is not "active" in the sense as defined in the instant application is that the double bond is bonded to either sulfur or oxygen. In the instant invention this same position would have a

carbonyl group. This would make the double bond active as defined in the instant application. In the instant invention the vinyl groups are "activated" to facilitate free radical polymerization. The formula given at col. 1, lines 25–30 of '885 does not lend itself to free radical polymerizatin due to the lack of resonance but rather it lends itself to ionic polymerization due to the polar nature of the substituents. Therefore, it would be extremely difficult, if at all possible, for '885 to form the compounds of the instant invention. Also, the compounds formed in '885 are not hydro-lytically stable because of the presence of the silicone-nitrogen bond in the formula. The instant invention cannot use a hydrolytically unstable compound. Furthermore, the products of this hydrolysis in '885 could be injurious to the human eye particularly the amines. Also, at col. 3 of '885 the linkage is an amine linkage to the double bond and in the instant invention this linkage is never an amine linkage. Therefore, '885 does not teach the instant hydrophilic sidechain siloxane containing monomers much less the instant water absorbing polymers.

U.S. Pat. No. 2,793,223 teaches, in pertinent part, at Example 5 at col. 3, lines 30–41 that a phenyl group is attached to the siloxane. Therefore, that material would be very hard. Contact lenses made from the polymers made from the monomers disclosed in '223, because of the presence of the phenyl group on the siloxane as shown in Example 5 of '223, would not transport oxygen sufficiently whereas contact lenses made from the instant polymers would transport oxygen sufficiently to meet the oxygen requirements of the human cornea. Furthermore, neither are hydrophilic sidechains disclosed in '223.

U.S. Pat. No. 3,228,741 teaches, in pertinent part, a silicone contact lens in general. However, nowhere are any hydrophilic sidechains disclosed. Neither does '741 teach a hydrophilic, water absorbing siloxane contact lens as in the instant invention.

U.S. Pat. No. 3,700,573 teaches, in pertinent part, radiation grafting of hydrophilic polymers to polysiloxanes. These siloxanes are then used in making contact lens. One skilled in the art would be taught that something must be done to polysiloxanes in order to make them hydrophilic. As taught in '573, silicones are inherently hydrophobic. In '573 the surface is treated in order to make this material hydrophilic. Surface treatment is not as effective as the instant invention for making a siloxane hydrophilic. Surface treatment only affects the surface on the contact lens. This surface can be removed, for example, by abrasion. However, in the instant invention, the siloxane material is hyrophilic throughout. Also, and most importantly, the instant material is water absorbing.

U.S. Pat. No. 3,916,033 teaches, in pertinent part, radiation grafting hydrophilic polymers onto polymethyl siloxane in order to make it hyprohilic. This material is then used to make contact lens. More specifically, '033 teaches using polydimethylsiloxane and radiation grafting onto the surface of this material, N-vinylpyrrolidone. As mentioned, grafting is not used in the instant invention.

U.S. Pat. No. 3,458,553 teaches, in pertinent part, a paraffinsiloxane which is not used in the instant invention but this siloxane contains either an amide or a cyano sidechain.

U.S. Pat. No. Re. 25,727 teaches, in pertinent part, an ether sidechain siloxane which is made by hydrosilation. The ether sidechain silicone is used as a surfactant. The siloxane is endcapped with trimethylsilyl groups. This siloxane backbone material is not used in the instant invention. Furthermore, '727 does not polymerize the material to form shaped bodies since the material disclosed in '727 is used as a surfactant. One does not polymerize a surfactant to a solid material if used as a surfactant.

U.S. Pat. No. 2,723,987 teaches, in pertinent part, a carboxylate, i.e., a carboxylic acid sidechain siloxane. The carboxylic sidechains are reacted with either an alcohol or an amine to make a polyamide or polyester. This is an intermediate material. These intermediates are particularly useful in the preparation of siloxane modified alkyd resins. '987 does not teach that the material, i.e., either the ester sidechain siloxanes or the carboxylic acid sidechain siloxanes by themselves can be cured to form shaped bodies. Also, in '987 the curing is done through the carboxylate groups by combining this with the polyalcohol or polyamine. This is not done in the instant invention. Neither are the backbones disclosed in '987 utilized in the instant invention.

U.S. Pat. No. 2,762,823, in pertinent part, teaches an amino sidechain siloxane. '823 describes the preparation of amino sidechain siloxanes. These amino sidechain siloxanes are not cured to form shaped bodies. Also, the amino functionality is used to react with polyacids to form polyamide type resins. These materials disclosed in '823 are cured through the amine groups by reacting with a diacid chloride, etc. This type of reaction is not used in the instant invention. In '823 the sidechain siloxanes are intermediates to form further end product. Furthermore, neither are the instant siloxane backbones disclosed in '823.

U.S. Pat. No. 2,770,631 teaches, in pertinent part, hydroxy ester substituted siloxanes. '631 teaches that a carboxyl group can be attached to the siloxane via a $CH_2$ radical. '631 does not teach any sidechains longer than a $CH_2$. However, the instant invention utilizes some of these sidechains materials and the longer chains would be more hydrolitically stable. It is known that hydroxy groups and ester groups that are alpha to silicone are much more stable than the beta substituted siloxanes. Also '631 does teach an ester that has an hydroxy group in the sidechains. However, the instant siloxane backbones are not taught in '631. Furthermore, the compounds are used in '631 as lubricants, sunscreen agents and these materials are soluble in silicone fluids which make them valuable as antioxidants and stabilizers for greases, etc. However, nowhere does '631 teach that the hydroxy ester sidechain siloxanes are cured to form a shaped body much less hydrophilic, water absorbing siloxane contact lenses. '631 would not want a polymerized material since these materials are used in lubricants and should remain fluid.

However, as mentioned, '631 does prepare an hydrcxy ester sidechain siloxane, a vinyl sidechain siloxane, a phenyl sidehchain siloxane but, as mentioned, does not cure them into shaped bodies or use the instant siloxane backbones.

U.S. Pat. No. 2,770,632 teaches, in pertinent part, an ester acid sidechain siloxane. The only length of the alkyl attaching the ester to the silicone is a $CH_2$ group. '632 does not teach longer chains. However, these short sidechains are used in the instant invention. Most importantly, however, these materials are used as lubricants and emulsifying agents, etc. Also, '632 makes the metal salts of the carboxylic acid which are utilized as sidechains in the instant invention but '632 uses these simply as emulsifying agents. In '632, these materials should not be polymerized due to the end uses taught in '632. However, these materials in '632 can be cured using polyhydric alcohols but these cures are not utilized in the instant invention. Most importantly, the backbones of the instant siloxanes are not disclosed in '632.

U.S. Pat. No. 2,819,245 teaches, in pertinent part, hydroxy sidechain siloxanes, amino sidechain siloxanes, carboxylic acid sidechain siloxanes, amide amino sidechain siloxanes, amide amino carboxylate sidechain siloxanes, all of which are utilized in the instant invention. However, '245 does not teach that these materials can be cured since these materials are used to react with epoxides. '245 uses the functionality present to react with an epoxy resin which is then cured. The instant invention does not do this. Furthermore, '245 does not teach contact lens or shaped bodies and most importantly does not teach the siloxane backbones of the instant invention.

U.S. Pat. No. 2,823,195 teaches, in pertinent part, reacting a carboxylic acid sidechain siloxane with a diamine to form a polyamide. The siloxane is being used as an intermediate. The siloxane, as mentioned, is reacted with a diamino or a triamino compound to make a polyamide. This reaction is not used in the instant invention. Neither does '197 teach a shaped body much less a water absorbing contact lens or even a contact lens. Most importantly, '197 does not teach the siloxane backbones of the instant invention.

U.S. Pat. No. 2,838,423 teaches, in pertinent part, an amide sidechain siloxane which is then reacted with formaldehyde and pyridine to make a pyridium salt. In '423 the material is used as s water repellent for fabrics. The salt sidechain siloxane is used in '423 in a relatively low percentage in order to make the siloxane adhere to the fabric. '423 is actually teaching using the polar sidechain as a binding agent for the fabric since '423 is making the fabric hydrophobic rather than hydrophilic. Therefore, '423 is using a salt for hydrophobic purposes. The instant invention is using this sidechain siloxane in order to make the siloxane contact lens hydrophilic and most importantly water absorbing. Also, neither does '423 teach the endcapped siloxane backbone of the instant invention.

U.S. Pat. No. 2,842,517 teaches, in pertinent part, an alcohol sidechain siloxane or a carboxylic acid sidechain siloxane. These may be reacted with an unsaturated diacid to make polyester resins. '517 uses a carboxylic group or the alcohol group as a curing functionality. This reaction is not utilized in the instant invention. Furthermore, '517 does not make shaped bodies with the siloxanes but reacts these siloxanes with other materials in order to make shaped bodies. However, the end product is not the instant endcapped siloxanes nor are the shaped bodies, contact lens.

U.S. Pat. No. 2,855,381 teaches, in pertinent part, amide sidechain siloxanes. '381 cures these siloxanes to form rubbers. '381 incorporates the amide sidechains into the siloxanes to make the silicone rubber more resistant to attack by hydrocarbon solvents and oils. '381 cures these siloxanes with a benzoyl peroxide cure. However, the instant benzoyl peroxide cure is completely different than the cure taught in '381. Therefore, '381 is only teaching how to make the silicone rubbers more resistant to oils. '381 does not teach that this makes the silicone rubber hydrophilic and '381 does not teach that this would make the silicone rubber water absorbing. Neither does '381 teach hydrophilic, water absorbing contact lens nor does '381 teach the endcapped siloxanes of the instant invention.

U.S. Pat. No. 2,894,967 teaches, in pertinent part, carboxylates and alcohol sidechain siloxanes. '967 teaches using these materials as chromium complexing agents. These materials are not used to form shaped bodies. Neither does '967 teach the endcapped siloxanes of the instant invention.

U.S. Pat. No. 2,924,587, U.S. Pat. No. 2,924,588 and U.S. Pat. No. 2,925,402 teach, in pertinent part, either alcohol sidechain siloxanes or carboxyl sidechain siloxanes, both of which are utilized in the instant invention. However, nowhere do these references, including '587, teach hydrophilic, water absorbing contact lenses. In '402, the material is cured with diacids, diisocyanates, diols, diamines, etc. These reactions are not used in the instant application. '588 teaches alcohol sidechain siloxanes. '588 teaches that functional siloxanes can be used to react with polyfunctional organic compounds such as dicarboxylic acids or diisocyanates to give a resinous material. '588 does not teach that one can take these materials per se and cure them into useful shaped bodies. These materials must be reacted with other materials in order to form shaped bodies. That is much different than in the instant application. Furthermore, neither does '587, '588 or '402 remotely teach the instant endcapped siloxanes.

U.S. Pat. No. 3,057,901 teaches, in pertinent part, a polyether alcohol sidechain siloxane. '901 teaches that this siloxane may be used as a surfactant. This patent does not teach the instant endcapped siloxanes, much less contact lens made therefrom.

U.S. Pat. No. 3,215,643, in pertinent part, teaches sulfate salt sidechain siloxanes. '643 teaches using this material for foaming solvents. This patent does not teach the instant endcapped siloxanes nor that these materials may have hydrophilic sidechains and be made into water absorbing contact lens.

U.S. Pat. No. 3,215,718 teaches, in pertinent part, sulfonic acid sidechain siloxanes. These materials are useful as water repellents for textiles. This patent does not teach the instant endcapped siloxanes much less that these materials may have hydrophilic sidechains and be made into water absorbing contact lens.

U.S. Pat. No. 3,246,048 teaches, in pertinent part, a polyether sidechain siloxane. The polyether is endcapped with an hydroxyl group. '048 teaches using the hydroxyl group for curing with a polyurethane. '048 does not teach the instant endcapped siloxanes nor that these materials may be made into water absorbing contact lens.

U.S. Pat. No. 3,249,586 teaches, in pertinent part, siloxane with a cyclic amide sidechain. In '586 this material is prepared by hydrosilation. The siloxane material of '586 can be useful as thermoplastic, elastomeric and resinous material. Nowhere does '586 teach that the final material is hydrophilic or water absorbing or that it can be used to make contact lens. Neither is the instant endcapped siloxanes disclosed or suggested by '586.

U.S. Pat. No. 3,317,460 teaches, in pertinent part, a polyalcohol sidechain siloxane. '460 teaches making copolymers with di- and trifunctional siloxanes. These materials are useful as curing agents for isocyanate prepolymers, for preparing polyurethane rubbers and for making varnishes. '460 does not teach the instant endcapped polysiloxanes nor that these materials when containing hydrophilic sidechains can be made into water absorbing contact lens.

U.S. Pat. No. 3,317,577 teaches, in pertinent part, a polyamino sidechain siloxane. '577 teaches that this material may be used as a surfactant. This patent does not teach the instant endcapped polysiloxanes nor that these materials, when containing a hydrophilic sidechain, can be made into water absorbing contact lens as in the instant invention.

U.S. Pat. No. 3,328,449 teaches, in pertinent part, a sulfonic salt sidechain siloxane. '449 teaches that this material may be used as detergents, ion exchange resins, wetting agents, antistatic agents for synthetic fibers and polymerization catalysts for siloxanes. This patent does not teach the instant endcapped polysiloxanes nor that these materials, when containing a hydrophilic sidechain, can be made into water absorbing contact lens as in the instant invention.

U.S. Pat. No. 3,338,943 teaches, in pertinent part, an amino sidechain and carboxyl sidechain copolymer which is then formed into an internal salt. '943 teaches that this material can be used as a protective coating for metals, etc. This patent does not teach the instant endcapped polysiloxanes nor that these materials, when containing a hydrophilic sidechain, can be made into water absorbing contact lens as in the instant invention.

U.S. Pat. No. 3,355,425 teaches, in pertinent part, a pyridine sidechain siloxane. '425 teaches using these materials for dyeing fabrics. This patent does not teach the instant endcapped polysiloxanes nor that these materials, when containing a hydrophilic sidechain, can be made into water absoring contact lens as in the instant invention.

U.S. Pat. No. 3,355,455 teaches, in pertinent part, the same sort of composition as in U.S. Pat. No. 3,355,425. This patent does not teach the instant endcapped polysiloxanes nor that these materials, when containing a hydrophilic sidechain, can be made into water absorbing contact lens as in the instant invention.

U.S. Pat. Nos. 3,398,104 and 3,402,192 teach, in pertinent part, ether sidechain siloxanes. The degree of polymerization of the ether sidechain is from 25 to 100. These materials are used as surfactants in the preparation of polyurethane foams. These patents do not teach the instant endcapped polysiloxanes nor that these materials, when containing a hydrophilic sidechain, can be made into water absorbing contact lens as in the instant invention.

U.S. Pat. No. 3,440,261 teaches, in pertinent part, an amino amide sidechain siloxane. This material is used as textile treating agent to improve the dyeability of the textile, and as creaseproofing and water repellent agents for textiles. This patent does not teach the instant endcapped polysiloxanes nor that these materials when containing hydrophilic sidechains can be used to make water absorbing contact lens as in the instant invention.

U.S. Pat. No. 3,508,959 teaches, in pertinent part, a siloxane which contains a sidechain which has sulfur, oxygen, ester, amide, amine, sulfonates, sulfonomide and multi-amino sidechains that are attached to the silicone. These materials are being used to render surfaces anticoagulative. This patent does not teach the instant endcapped polysiloxanes nor that these materials when containing hydrophilic sidechains can be used to make water absorbing contact lens as in the instant invention.

U.S. Pat. No. 3,512,915 teaches, in pertinent part, a diamino sidechain siloxane used for textile dyeing. This patent does not teach the instant endcapped polysiloxanes nor that these materials when containing hydrophilic sidechains can be used to make water absorbing contact lens as in the instant invention.

U.S. Pat. No. 3,518,288 teaches, in pertinent part, a polyether sidechain siloxane which is used as a surfactant. This patent does not teach the instant endcapped polysiloxanes nor that these materials when containing hydrophilic sidechains can be used to make water absorbing contact lens as in the instant invention.

U.S. Pat. No. 3,560,543 teaches, in pertinent part, a polyamino sidechain siloxane. This patent does not teach the instant endcapped polysiloxanes or that these materials when containing a hydrophilic sidechain can be used to make water absorbing contact lens as in the instant invention.

U.S. Pat. No. 3,560,544 teaches, in pertinent part, a trimethylsilyl endcapped siloxane which has a polyether-ester-acid sidechain attached. This patent does not teach the instant endcapped polysiloxanes or that these materials when containing a hydrophilic sidechain can be used to make water absorbing contact lens as in the instant invention.

U.S. Pat. No. 3,627,806 teaches, in pertinent part, a mono or dicarboxylate sidechain silane. This material is used as adhesion promoters for silicon rubber. This patent does not teach the instant endcapped polysiloxanes or that these materials when containing a hydrophilic sidechain can be used to make water absorbing contact lens as in the instant invention.

U.S. Pat. No. 3,703,486 teaches, in pertinent part, a siloxane which contains a sidechain which has a solubilizing group attached. The solubilizing group may be either COOH, carboxylic acid, carboxylic acid ester, amide, amine, cyano, thio, hydrocarbon or a ketone. This material is used as a polymer for foam. In the instant invention, the solubilizing group sidechains act not only as hydrophilic sidechains but these sidechains tend to increase the solubilizing factors. '486 is using solubilizing sidechains but for a completely different reason. '486 is using a completely different type of system than in the instant invention. Also, this patent does not teach the instant endcapped polysiloxanes or that these materials when containing hydrophilic sidechains can be used to make water absorbing contact lens as in the instant invention.

U.S. Pat. No. 3,729,444 teaches, in pertinent part, a carboxylic acid sidechain siloxane, copolymerized with difunctional siloxanes. This material is used to enhance paper's resistance to wetting. Also, this patent does not teach the instant endcapped polysiloxanes or that these materials when containing hydrophilic sidechains can be used to make water absorbing contact lens as in the instant invention.

U.S. Pat. No. 3,734,763 and U.S. Pat. No. 3,843,529 teach, in pertinent part, siloxanes which contain quaternary ammonium sidechains. These materials are being used as surfactants and lubricants. These patents do not teach the instant endcapped polysiloxanes or that these materials when containing hydrophilic sidechains can be used to make water absorbing contact lens as in the instant invention.

U.S. Pat. No. 3,846,329 teaches, in pertinent part, a polyether sidechain siloxane as a foam controller. This patent does not teach the instant endcapped polysiloxanes nor that these materials when containing hydrophilic sidechains can be used to make water absorbing contact lens as in the instant invention.

U.S. Pat. No. 2,971,864 teaches, in pertinent part, a diamino sidechain silane. This material is used in latexes. This patent does not teach the instant endcapped polysiloxanes nor that these materials when containing hydrophilic sidechains can be used to make water absorbing contact lens as in the instant invention.

U.S. Pat. No. 3,884,860 teaches, in pertinent part, a carboxylic acid and sulfide linkage sidechain siloxanes and copolymers with difunctional siloxanes. These materials are useful as resin intermediates in water reducible coating formulations. This patent does not teach the instant endcapped polysiloxanes nor that these materials when containing hydrophilic sidechains can be used to make water absorbing contact lens as in the instant invention.

U.S. Pat. No. 3,033,815 teaches, in pertinent part, an amino-cyano, an amino ester or an amino amide sidechain siloxane. These materials are useful as sizes for fibrous glass materials. This patent does not teach the instant endcapped polysiloxanes nor that these materials when containing hydrophilic sidechains can be used to make water absorbing contact lens as in the instant invention.

U.S. Pat. No. 2,823,218 teaches, in pertinent part, hydrosilation which is one of the processes used herein. This patent does not teach the instant endcapped polysiloxanes nor that these materials when containing hydrophilic sidechains can be used to make water absorbing contact lens as in the instant invention.

U.S. Pat. No. 2,928,858 teaches, in pertinent part, an amide carboxylate sidechain siloxane. '858 teaches an amide linkage which has a carboxylic acid and carboxylic acid chloride attached thereto. This patent does not teach the instant endcapped polysiloxanes nor that these materials when containing hydrophilic sidechains can be used to make water absorbing contact lens as in the instant invention.

U.S. Pat. No. 2,929,829 teaches, in pertinent part, an amide sidechain siloxane. This patent does not teach the instant endcapped polysiloxanes nor that these materials when containing hydrophilic sidechains can be used to make water absorbing contact lens as in the instant invention.

U.S. Pat. No. 2,989,559 teaches in pertinent part, a ketone sidechain siloxane. This patent does not teach the instant endcapped polysiloxanes nor that these materials when containing hydrophilic sidechains can be used to make water asbsorbing contact lens as in the instant invention.

U.S. Pat. No. 3,032,577 teaches, in pertinent part, an amino sidechain siloxane which has hydroxy alkyl groups attached to the amino group. This patent does not teach the instant endcapped polysiloxanes nor that these materials when containing hydrophilic sidechains can be used to make water absorbing contact lens as in the instant invention.

U.S. Pat. No. 3,071,561 teaches, in pertinent part, a pyridine sidechain siloxane. This patent does not teach the instant endcapped polysiloxanes nor that these materials when containing hydrophilic sidechains can be used to make water absorbing contact lens as in the instant invention.

U.S. Pat. No. 3,152,161 teaches, in pertinent part, an hydroxyalkyl diamino siloxane. This patent does not teach the instant endcapped polysiloxanes nor that these materials when containing hydrophilic sidechains can be used to make water absorbing contact lens as in the instant invention.

U.S. Pat. No. 3,598,785 teaches an amide endcapped siloxane. This patent does not teach the instant endcapped polysiloxanes nor that these materials when containing hydrophilic sidechains can be used to make water absorbing contact lens as in the instant invention.

U.S. Pat. No. 3,658,867 teaches, in pertinent part, a quaternary ammonium sidechain siloxane. This patent does not teach contact lenses much less the instant contact lenses. Neither does this patent teach the instant endcapped polysiloxanes nor that these materials, when containing hydrophilic sidechains, can be used to make water absorbing contact lens as in the instant invention.

U.S. Pat. No. 3,660,452 teaches, in pertinent part, an amino sulfate salt sidechain siloxane. This patent does not teach contact lenses much less the instant contact lenses. Neither does this patent teach the instant endcapped polysiloxanes nor that these materials, when containing hydrophilic sidechains, can be used to make water absorbing contact lens as in the instant invention.

U.S. Pat. No. 3,737,336 teaches, in pertinent part, an amino sidechain siloxane. This amino endcapped siloxane is used as a hydrophobic coating. This patent does not teach the instant endcapped polysiloxanes nor that these materials, when containing hydrophilic sidechains, can be used to make water absorbing contact lens.

U.S. Pat. No. 3,836,559 teaches, in pertinent part, quaternary ammonium sidechain siloxane. This patent does not teach the instant endcapped polysiloxanes nor that these materials, when containing hydrophilic sidechains, can be used to make water absorbing contact lens.

U.S. Pat. No. 3,878,168 teaches, in pertinent part, sidechains that have amide, sulfonamide and urea sidechain siloxanes. This patent does not teach the instant endcapped polysiloxanes nor that these materials, when containing hydrophilic sidechains, can be used to make water absorbing contact lens.

U.S. Pat. No. 4,018,723 teaches, in pertinent part, morpholino modified polyether sidechain polysiloxane. The morpholine group, which has an oxygen and nitrogen in a 6-membered ring, is used as a fire retardant. This patent does not teach the instant endcapped polysiloxanes nor that these materials, when containing hydrophilic sidechains, can be used to make water absorbing contact lenses.

U.S. Pat. No. 4,049,674, U.S. Pat. No. 4,049,675 and U.S. Pat. No. 4,049,676 teach, in pertinent part, sulfolanyl siloxanes made by hydrosilation. These materials are used as surfactants and as fire retardants. These patents do not teach the instant endcapped polysiloxanes nor that these materials, when containing hydrophilic sidechains, can be used to make water absorbing contact lenses.

U.S. Pat. No. 3,993,606 teaches, in pertinent part, carboxylate salt of an amino siloxane. This patent does not teach the instant endcapped polysiloxanes nor that these materials, when containing hydrophilic sidechains, can be used to make water absorbing contact lenses.

U.S. Pat. No. 3,586,699 teaches, in pertinent part, an imido sidechain siloxane. This imido group is a nitrogen which has two carbonyl groups attached to it. In '699, it is taught that a cyclic siloxane compound containing one of these sidechains can be polymerized to form a high molecular weight polymer. This material is cured to form an elastomer. This patent does not teach the instant endcapped polysiloxanes nor that these materials, when containing hydrophilic sidechains, can be used to make water absorbing contact lenses as in the instant invention.

U.S. Pat. No. 3,700,713 teaches, in pertinent part, an ether amide-amino sidechain siloxane made by hydrosilation. This patent does not teach the instant endcapped polysiloxanes nor that these materials, when containing hydrophilic sidechains, can be used to make water absorbing contact lenses as in the instant invention.

SUMMARY OF THE INVENTION

The instant invention provides water absorbing polysiloxane materials which can be used for biomedical devices, such as, contact lenses, heart valves and intraocular lenses.

The instant invention comprises a water absorbing, soft, hydrophilic, flexible, fillerless, hydrolytically stable, biologically inert contact lens with the capability of transporting oxygen sufficiently to meet the requirements of the human cornea. The instant contact lenses are prepared from a material comprising a hydrophilic sidechain containing polysiloxane monomer $\alpha,\omega$ terminally bonded through divalent hydrocarbon groups to polymerizable, free radical polymerizably activated, unsaturated groups polymerized or copolymerized to form a polymer in a crosslinked network which is capable upon saturation with water of absorbing from about 1 percent to about 99 percent by weight of water, based on the total weight of the polymer and water.

There are commercially available both hydrophobic and hydrophilic contact lenses. The hydrophobic contact lenses available are primarily hard contact lenses made from such material as polymethyl methacrylate (PMMA). However, there are soft contact lenses available which are hydrophilic. Furthermore, these lenses are usually water absorbing lenses and are made from polymers and copolymers based on 2-hydroxyethylmethacrylate (HEMA). However, neither of the materials made from PMMA or PHEMA are oxygen permeable enough to meet all the oxygen requirements of the human cornea. Therefore, a material had to be developed which was soft for comfort and also oxygen permeable to the extent that when the material was made into a contact lens sufficient oxygen would pass through the material to meet all the oxygen requirements of the human cornea. It was found that polysiloxane materials are oxygen permeable to the extent that oxygen will pass through these materials when made into a contact lens sufficiently to meet the requirements of the human cornea. Also, contact lenses made from polysiloxanes are soft resulting in more comfort for the wearer. Therefore, it was found that polysiloxane materials would be good candidates for making soft contact lenses. However, it was found that when soft contact lenses were made from known polysiloxane materials these lenses do not ride on the cornea of the eye on a layer of tears but rather attach themselves to the cornea in a manner which alters the metabolic outflow and inflow of fluid from the eye. It is known that non-movement or substantially non-movement of soft contact lenses on the eye can result in physical damage to the cornea. As mentioned, it has been noted that when a soft contact lens moves on the eye there is also an exchange of tear fluid under the lens resulting in the exchange of metabolic products supplying the cornea and metabolic byproducts being removed from the cornea. This movement of tear fluid results in maintaining a healthy environment for the cornea. This has been generally reported by Roth, H. W. and Iwasaki, W., *Complications Caused by Silicon Elastomer Lenses in West Germany and Japan,* paper presented at the Second Contact Lens Conference, Feb. 18, 1979, in Tokyo, Japan (Prof. Motoichi Itoi, M. D., Kyoto Prefectural University of Medicine, Hirokohji, Kawara Machi-Dohri, Kamikyo-Ku, Kyoto 602; Kreiner, Christine F., Neues Optikerjournal, No. 2 (21) Feb. 10, 89 (1979); VonArens, Franz D., Neues Optikerjournal No. 3, (21) Mar. 10, 93 (1979): and VonZimmermann,, E., Neues Optikerjournal, No. 4, (21) Apr. 10, 73 (1979).

It was discovered that when a soft contact lens absorbs water and is hydrophilic, that the lens will move on the eye sufficiently so that no physical damage will occur to the cornea and sufficient tear exchange will occur so that corneal metabolism will proceed normally. This has been true when observing the PHEMA lens. The non-movement problem associated with siloxane contact lens has been a major obstacle in preventing the use of polysiloxanes as soft contact lens material. This major obstacle has now been overcome by the instant invention. Therefore, most unexpectedly the instant hydrophilic sidechain containing polysiloxane polymers and copolymers are not only hydrophilic but are also water absorbing. Therefore, the instant polymers and copolymers make excellent material for manufacturing contact lenses which not only do not stick to the eye but move sufficiently during normal wear so that corneal metabolism will proceed normally.

When the hydrophilic sidechain containing polysiloxane monomers of the instant invention are copolymerized with from about 5.0 percent to about 90.0 percent by weight, based on the total weight of the copolymer, certain comonomers or mixtures thereof disclosed herein, a copolymer is formed which is unexpectedly transparent, hydrophilic and water absorbing. When the copolymer was formed into contact lenses, the lenses when saturated with water unexpectedly absorbed from about 1 percent to about 99 percent by weight, based on the total weight of the copolymer, of water. This invention is a major advancement in the state of polysiloxane contact lens art. A further advantage of using the instant hydrophilic sidechains is that the sidechains increase compatibility between comonomers. Therefore, a higher percentage of comonomers may be copolymerized with the siloxane monomers without phase separation, resulting in an optically clear, not a cloudy, product. However, if there is phase separation, the domains are not large enough to scatter visible light so the product still remains optically clear. This is important since the other comonomers disclosed herein also add to the water absorbing properties of the copolymers formed herein.

More specifically, the instant invention comprises a soft, hydrophilic, water absorbing, flexible, hydrolytically stable, biologically inert, transparent contact lens with the capability of transporting oxygen sufficiently to meet the requirements of the human cornea. The instant contact lens is made from a hydrophilic sidechain containing polysiloxane monomer $\alpha,\omega$ terminally bonded through a divalent hydrocarbon groups to polymerizable, free radical polymerizably activated, unsaturated groups polymerized or copolymerized with certain comonomers forming a homopolymer or a copolymer in a crosslinked network, capable upon saturated with water, of absorbing from about 1 percent to about 99 percent by weight of water, based on the total weight of the polymer and water.

The three-dimensional network polymer products of the instant invention are readily prepared by means of conventional polymeriztion techniques. For example, the monomers together with about 0.05 to about 4.0 percent, preferably 0.05 to 2.0 percent by weight of an appropriate free radical initiator may be heated to a temperature of from about 30° C. to about 100° C. to initiate and complete the polymerization. The polymerizable monomers can preferably be subjected at room temperature to radiation by UV light in the presence of suitable activators such as benzoin, acetophenone, benzophenone and the like for a sufficient time so as to form a three-dimensional polymer network.

The polymerization can be carried out directly in contact lens molds or can be cast into discs, rods, or sheets which can then be fabricated to a desired shape. Preferably the polymerization is carried out while the material is being spin cast, such as taught in U.S. Pat. No. 3,408,429.

When the term "movable soft contact lens" is used herein it is meant that when the lens is placed on the eye and during normal wear the lens will move at least 0.5 mm with each blink of the eyelid. Preferably the lens should move from about 0.5 mm to about 1.0 mm with each blink.

Further, when the term "movable soft contact lens" is used herein, it is meant that the lens moves sufficiently on the eye so that (1) no physical damage occurs to the cornea and (2) sufficient tear fluid exchange occurs under the lens so that sufficient cornea metabolic activity is maintained resulting in a healthy environment for the cornea.

When the term "non-movable soft contact lens" is used herein, it is meant that the lens will move less than about 0.5 mm with each blink of the eyelid.

When the term "hydrophilic soft contact lens" is used herein, it is meant that the soft contact lens surface will not repel water as opposed to the "hydrophobic" where the lens surface will tend to repel water.

When the term "water absorbing soft contact lens" is used herein, it is meant that the lens will absorb from about 1 percent to about 99 percent by weight of water, based on the total weight of the polymer and water.

DESCRIPTION OF PREFERRED EMBODIMENTS

In accordance with the preferred embodiments of this invention shaped articles for use in biomedical applications including contact lenses are provided which are fabricated from three-dimensional network polymers and copolymers comprising a hydrophilic sidechain containing polysiloxane monomer, $\alpha,\omega$ terminally bonded through divalent hydrocarbon groups to polymerizable, free radical polymerizably activated, unsaturated groups copolymerized with from about 5.0 percent by weight to about 90.0 percent by weight based on the total weight of the copolymers of a comonomer forming a polymer in a crosslinked network capable of absorbing from about 1 percent to about 99 percent by weight of water based upon the total weight of the polymer and water.

the contact lens of the instant invention is water absorbing, soft, hydrophilic, flexible, fillerless, hydrolytically stable and biologically inert. This lens has the capability of transporting oxygen sufficiently to meet the requirements of the human cornea.

The contact lens of the instant invention has the following formula:

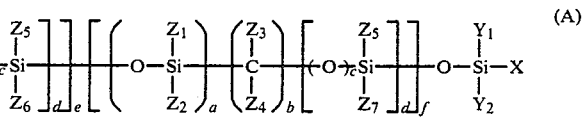

(A)

wherein $Y_1$ and $Y_2$ equal the same or different and are selected from the group consisting of a hydrocarbon having from 1 to 20 carbon atoms and a halogenated hydrocarbon having from 1 to 20 carbon atoms, X is a polymerizable, free radical polymerizably activated, unsaturated group bonded through a divalent hydrocarbon group, a is at least 1, b is zero or at least 2, c is 1 if b is zero and c is zero if b is at least 2, d is at least 1, except when b is zero and a is 1 then d is zero or greater, e is at least 1 and f is zero or greater, $Z_1$ through $Z_7$ are the same or different and at least one of $Z_1$ through $Z_7$ is a hydrophilic sidechain and $Z_1$ through $Z_7$ are selected from the group consisting of a monovalent hydrocarbon having from 1 to 20 carbon atoms, a halogenated monovalent hydrocarbon having from 1 to 20 carbon atoms and a hydrophilic sidechain with the following formulas selected from the group consisting of

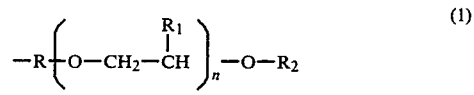

(1)

wherein R is a divalent hydrocarbon having from 1 to 10 carbon atoms, $R_1$ is selected from the group consisting of methyl and hydrogen, $R_2$ is selected from the group consisting of hydrogen, a monovalent hydrocarbon having from 1 to 10 carbon atoms

wherein $R_3$ is selected from the group consisting of a monovalent hydrocarbon having from 1 to 10 carbon atoms and a hydrogen, and n is at least 1,

(2)

wherein $R_4$ is a hydrocarbon having from 1 to 20 carbon atoms and a valence of $n_1+1$, $n_1$ is at least 1 and there cannot be an —OH group on an aliphatic carbon atom beta to the Si atom and there can be no more than one oxygen atom on any one carbon atom,

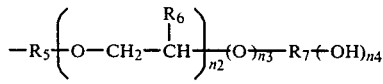 (3)

wherein $R_5$ is a divalent hydrocarbon having from 1 to 10 carbon atoms, $R_6$ is selected from the group consisting of hydrogen and methyl and $R_7$ is a hydrocarbon having from 1 to 20 carbon atoms and a valence of $n_4+1$ and can have no more than 1 oxygen atom attached to any one carbon atom, $n_2$ is zero or greater, $n_3$ is an integer from zero to 1 and $n_4$ is at least 1,

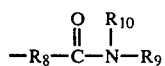 (4)

wherein $R_8$ is a divalent hydrocarbon having from 2 to 10 carbon atoms, and the

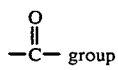 group is not attached to a carbon atom of $R_8$ is alpha to the Si atom, $R_9$ and $R_{10}$ can be the same or different and are selected from the group consisting of a monovalent hydrocarbon having from 1 to 10 carbon atoms, hydrogen,

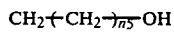

wherein $n_5$ is an integer from 1 to 3 and

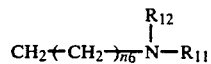

wherein $R_{11}$ and $R_{12}$ are the same or different and are selected from the group consisting of hydrogen and a monovalent hydrocarbon having from 1 to 10 carbon atoms and $n_6$ is an integer from 1 to 5,

 (5)

wherein $R_{13}$ is a divalent hydrocarbon having from 1 to 20 carbon atoms and $R_{14}$ and $R_{15}$ are the same or different and are selected from the group consisting of hydrogen and a monovalent hydrocarbon having from 1 to 10 carbon atoms,

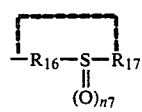 (6)

wherein $R_{16}$ is a divalent or trivalent hydrocarbon having from 1 to 10 carbon atoms and the S atom is not attached to $R_{16}$ by an aliphatic carbon atom beta to the Si atom, $R_{16}$ may or may not be attached to $R_{17}$ to form a ring which contains more than 3 carbon atoms and $R_{17}$ is selected from the group consisting of a hydrocarbon having from 1 to 10 carbon atoms and $O^\ominus M^\oplus$ where M is selected from the group consisting of a monovalent metal ion and a quaternary ammonium ion, and $n_7$ is an integer from 1 to 2,

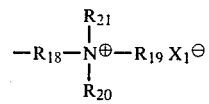 (7)

wherein $R_{18}$ is a divalent hydrocarbon having from 3 to 10 carbon atoms and the $N^\oplus$ must be attached to a carbon atom of $R_{18}$ which is at least 2 carbon atoms away from the Si atom, $R_{19}$, $R_{20}$ and $R_{21}$ are the same or different and are monovalent hydrocarbons having from 1 to 10 carbon atoms, $X^\ominus_1$ is a monovalent anion selected from the group consisting of halides, $R_{22}$—$COO^\ominus$ wherein $R_{22}$ is selected from the group consisting of hydrogen, a monovalent hydrocarbon having from 1 to 10 carbon atoms and a halogenated monovalent hydrocarbon having from 1 to 10 carbon atoms and $R_{23}$—$SO_3^\ominus$ wherein $R_{23}$ is selected from the group consisting of a monovalent hydrocarbon having from 1 to 10 carbon atoms and a halogenated monovalent hydrocarbon having from 1 to 10 carbon atoms,

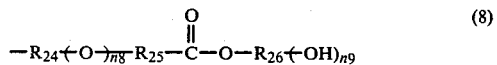 (8)

wherein $R_{24}$ is a divalent hydrocarbon having from 1 to 10 carbon atoms and $n_8$ is an integer from 0 to 1 and when $n_8$ is 1 the oxygen cannot be attached to an aliphatic carbon atom in $R_{24}$ which is beta to the Si atom, $R_{25}$ is a divalent hydrocarbon having from 1 to 10 carbon atoms, $R_{26}$ is a hydrocarbon having from 2 to 20 carbon atoms and a valence of $n_9+1$ and can have no more than 1 oxygen atom attached to any one carbon atom and $n_9$ is at least 1,

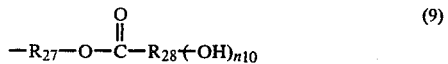 (9)

wherein $R_{27}$ is a divalent hydrocarbon having from 1 to 10 carbon atoms and the oxygen atom bonded to $R_{27}$ cannot be attached to an aliphatic carbon atom in $R_{27}$ which is beta to the Si atom, $R_{28}$ is a hydrocarbon having from 2 to 20 carbon atoms and a valence of $n_{10}+1$ and can have no more than 1 oxygen atom attached to any one carbon atom and $n_{10}$ is an integer of at least 1,

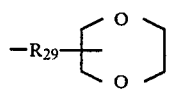 (10)

wherein $R_{29}$ is a divalent hydrocarbon having from 1 to 10 carbon atoms,

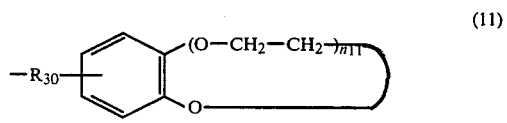 (11)

wherein $R_{30}$ is a divalent hydrocarbon having from 0 to 10 carbon atoms and $n_{11}$ is an integer from 1 to 10,

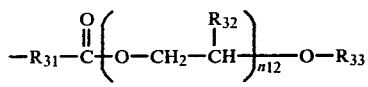 (12)

wherein $R_{31}$ is a divalent hydrocarbon having from 2 to 10 carbon atoms and the carbonyl group is not attached to a carbon atom alpha to the Si atom, $R_{32}$ is selected from the group consisting of methyl and hydrogen, $R_{33}$ is selected from the group consisting of hydrogen, a monovalent hydrocarbon having from 1 to 10 carbon atoms and

wherein $R_{34}$ is a monovalent hydrocarbon having from 1 to 10 carbon atoms and $n_{12}$ is at least 1,

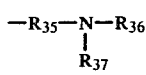 (13)

wherein $R_{35}$ is a divalent hydrocarbon having from 1 to 10 carbon atoms, $R_{36}$ and $R_{37}$ can be the same or different and are selected from the group consisting of hydrogen, monovalent hydrocarbons having from 1 to 10 carbon atoms and

where $n_{13}$ is 2 to 4,

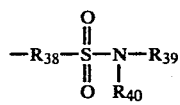 (14)

wherein $R_{38}$ is a divalent hydrocarbon having from 1 to 10 carbon atoms and the S atom cannot be attached to a carbon atom of $R_{38}$ which is alpha to the Si atom, $R_{39}$ and $R_{40}$ can be the same or different and are selected from the group consisting of hydrogen and a monovalent hydrocarbon having from 1 to 10 carbon atoms,

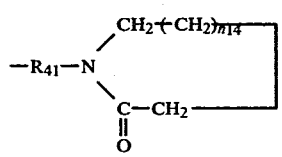 (15)

wherein $R_{41}$ is a divalent hydrocarbon having from 1 to 10 carbon atoms and $n_{14}$ is an integer from zero to 3,

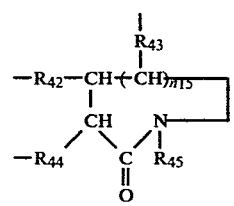 (16)

wherein $n_{15}$ is an integer from zero to 3, $R_{42}$ and $R_{43}$ are selected from the group consisting of hydrogen, divalent or monovalent hydrocarbon having from 0 to 10 carbon atoms, and $R_{44}$ is selected from the group consisting of hydrogen, divalent or monovalent hydrocarbon having from 1 to 10 carbon atoms and only one of $R_{42}$, $R_{43}$ and $R_{44}$ must be a divalent hydrocarbon and attached to the Si atom, $R_{45}$ is selected from the group consisting of hydrogen, a monovalent hydrocarbon having from 1 to 10 carbon atoms

wherein $n_{16}$ is an integer from 2 to 4,

 (17)

wherein $R_{46}$ is a divalent hydrocarbon having from 2 to 10 carbon atoms and the carbonyl group cannot be attached to a carbon atom alpha to the Si atom and $X_2^{\oplus}$ is a monovalent cation selected from the group consisting of monovalent metal cations and

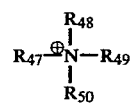

wherein $R_{47}$, $R_{48}$, $R_{49}$ and $R_{50}$ are the same or different and selected from the group consisting of hydrogen and a monovalent hydrocarbon having from 1 to 10 carbon atoms,

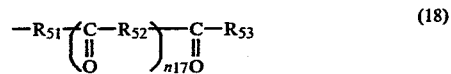 (18)

wherein $R_{51}$ is a divalent hydrocarbon having from 1 to 10 carbon atoms and the carbonyl group cannot be attached to a carbon atom which is alpha to the Si atom, $R_{52}$ is a divalent hydrocarbon having from one to 10 carbon atoms, $R_{53}$ is selected from the group consisting of hydrogen and a monovalent hydrocarbon having from 1 to 10 carbon atoms and $n_{17}$ is an integer from zero to 10, and

wherein $R_{54}$ is a hydrocarbon having from 1 to 20 carbon atoms and having a valence of $n_{18}+1$ and no $-C\equiv-$ group is attached to a carbon atom of $R_{54}$ which is alpha to the Si atom and $n_{18}$ is an integer greater than zero;

(B) polymerized with comonomers selected from the group consisting of

 (1)

wherein $R_{55}$ is selected from the group of hydrogen and methyl and B is selected from the group consisting of

wherein $R_{56}$ is selected from the group consisting of hydrogen and a monovalent hydrocarbon having from 1 to 20 carbon atoms,

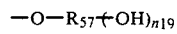

wherein $R_{57}$ is a hydrocarbon having from 2 to 20 carbon atoms and a valence of $n_{19}+1$ and can have no more than one oxygen atom attached to any one carbon atom and $n_{19}$ is an integer greater than zero,

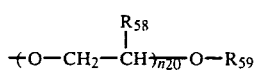

wherein $R_{58}$ is selected from the group consisting of hydrogen and methyl, $R_{59}$ is selected from the group consisting of hydrogen, a monovalent hydrocarbon having from 1 to 20 carbon atoms, and

wherein $R_{60}$ is a monovalent hydrocarbon having from 1 to 20 carbon atoms and $n_{20}$ is an integer greater than zero,

wherein $R_{61}$ and $R_{62}$ are the same or different and are selected from the group consisting of hydrogen, a monovalent hydrocarbon having from 1 to 20 carbon atoms and

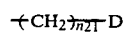

wherein D is selected from the group consisting of

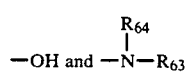

wherein $R_{63}$ and $R_{64}$ are the same or different and are hydrogens and monovalent hydrocarbons having from 1 to 20 carbon atoms and $n_{21}$ is an integer from 2 to 3,

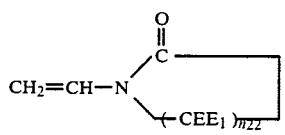

wherein E and $E_1$ are the same or different and are selected from the group consisting of hydrogen and a monovalent hydrocarbon having from 1 to 10 carbon atoms and $n_{22}$ is an integer from 2 to 5

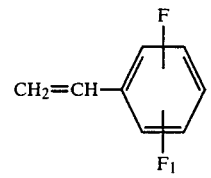

wherein F and $F_1$ are the same or different and are selected from the group consisting of hydrogen, a halogen, a monovalent hydrocarbon having from 1 to 20 carbon atoms, hydroxyl,

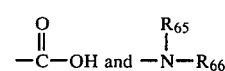

wherein $R_{65}$ and $R_{66}$ are the same or different and are selected from the group consisting of hydrogen and a monovalent hydrocarbon having from 1 to 20 carbon atoms,

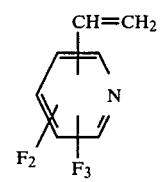

wherein $F_2$ and $F_3$ are the same or different and are selected from the group consisting of hydrogen and a monovalent hydrocarbon having from 1 to 10 carbon atoms,

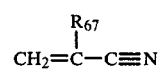

wherein $R_{67}$ is selected from the group consisting of hydrogen and methyl,

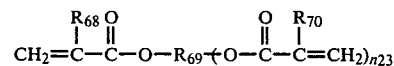

wherein $R_{68}$ and $R_{70}$ are the same or different and are selected from the group consisting of hydrogen and methyl, $R_{69}$ is a hydrocarbon having from 1 to 20 carbon atoms and a valence of $n_{23}+1$ and $n_{23}$ is an integer from 1 to 5,

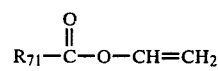

wherein $R_{71}$ is a monovalent hydrocarbon having from 1 to 20 carbon atoms and

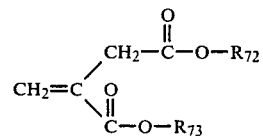

wherein $R_{72}$ and $R_{73}$ are the same or different and are selected from the group consisting of hydrogen and monovalent hydrocarbon having from 1 to 20 carbon atoms.

The preferred amount of water absorbed is from about 5.0 percent to about 99 percent by weight, based on the total weight of the polymer and water.

Other monomers may be used in addition to the instant hydrophilic sidechain containing polysiloxane monomers to form the water absorbing polymers of the instant invention. Any monomer or mixtures of monomers which (1) are soluble or compatible with the instant disclosed hydrophilic sidechain containing polysiloxanes and (2) when polymerized with the instant siloxanes do not form separate domains, which are large enough to scatter visible light, are useful as comonomers.

The preferred amount of additional comonomers, either alone or mixtures thereof, is from about 0.5 percent to about 90.0 percent by weight based on the total weight of the polymer.

The more preferred amount of these comonomers which are used with the hydrophilic sidechain containing polysiloxane monomers herein is from about 0.5 percent to about 70.0 percent by weight based on the total weight of the polymer.

The following are preferred comonomers which may be copolymerized with the instant hydrophilic sidechain containing siloxane monomers disclosed herein to form water absorbing polysiloxane polymers:

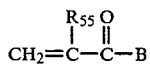  (1)

wherein $R_{55}$ is selected from the group of hydrogen and methyl and B is selected from the group consisting of

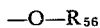

wherein $R_{56}$ is selected from the group consisting of hydrogen and a monovalent hydrocarbon having from 1 to 20 carbon atoms,

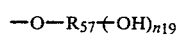

wherein $R_{57}$ is a hydrocarbon having from 2 to 20 carbon atoms and a valence of $n_{19}+1$ and can have no more than one oxygen atom attached to any one carbon atom and $n_{19}$ is an integer greater than zero,

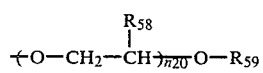

wherein $R_{58}$ is selected from the group consisting of hydrogen and methyl, $R_{59}$ is selected from the group consisting of hydrogen, a monovalent hydrocarbon having from 1 to 20 carbon atoms,

wherein $R_{60}$ is a monovalent hydrocarbon having from 1 to 20 carbon atoms and $n_{20}$ is an integer greater than zero,

wherein $R_{61}$ and $R_{62}$ are the same or different and are selected from the group consisting of hydrogen, a monovalent hydrocarbon having from 1 to 20 carbon atoms and

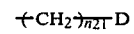

wherein D is selected from the group consisting of

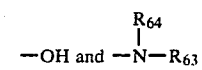

wherein $R_{63}$ and $R_{64}$ are the same or different and are hydrogens and monovalent hydrocarbons having from 1 to 20 carbon atoms and $n_{21}$ is an integer from 2 to 3,

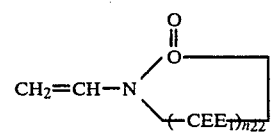  (2)

wherein E and $E_1$ are the same or different and are selected from the group consisting of hydrogen and a monovalent hydrocarbon having from 1 to 10 carbon atoms and $n_{22}$ is an integer from 2 to 5,

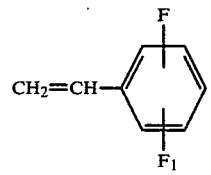  (3)

wherein F and $F_1$ are the same or different and are selected from the group consisting of hydrogen, a halogen, a monovalent hydrocarbon having from 1 to 20 carbon atoms, hydroxyl,

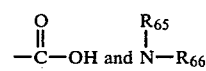

wherein $R_{65}$ and $R_{66}$ are the same or different and are selected from the group consisting of hydrogen and a hydrocarbon having from 1 to 20 carbon atoms,

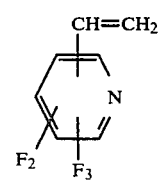  (4)

wherein $F_2$ and $F_3$ are the same or different and are selected from the group consisting of hydrogen and a monovalent hydrocarbon having from 1 to 10 carbon atoms,

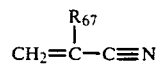 (5)

wherein $R_{67}$ is selected from the group consisting of hydrogen and methyl,

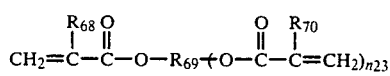 (6)

wherein $R_{68}$ and $R_{70}$ are the same or different and are selected from the group consisting of hydrogen and methyl, $R_{69}$ is a hydrocarbon having from 1 to 20 carbon atoms and a valence of $n_{23}+1$ and $n_{23}$ is an integer from 1 to 5,

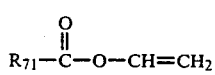 (7)

wherein $R_{71}$ is a monovalent hydrocarbon having from 1 to 20 carbon atoms and

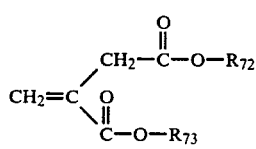

wherein $R_{72}$ and $R_{73}$ are the same or different and are selected from the group consisting of hydrogen and monovalent hydrocarbon having from 1 to 20 carbon atoms.

When thee are more than one $Z_1$ on the backbone of the polymer, all of the $Z_1$'s may be the same or different. Also, this applies to $Z_2$ through $Z_7$. For example, the following formula is illustrative of this:

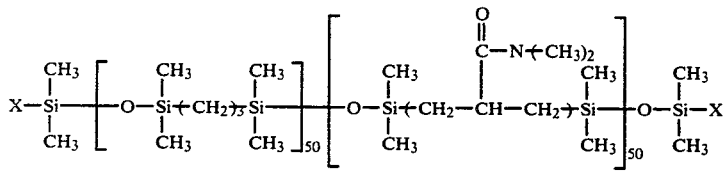

In order to easily locate the Z's, compare the above formula with the broad general formula disclosed herein. In the above formula $Z_1$, $Z_2$, $Z_5$, $Z_6$ and $Z_7$ equal —CH$_3$, all the $Z_4$'s equal hydrogen and there are 250 $Z_3$'s equal to hydrogen and 50 $Z_3$'s equal to

The following are the more preferred comonomers used herein with the instant hydrophilic sidechain containing polysiloxane monomers:

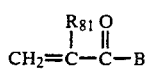 (1)

wherein $R_{81}$ is selected from the group consisting of hydrogen and methyl and B is —O—$R_{82}$ wherein $R_{82}$ is selected from the group consisting of a monovalent hydrocarbon having from 1 to 12 carbon atoms, a monovalent hydrocarbon derivative having from 1 to 20 carbon atoms and hydrogen, and more preferably $R_{82}$ is selected from the group consisting of hydrogen, methyl, ehtyl, n-propyl, isopropyl, n-butyl and isobutyl,

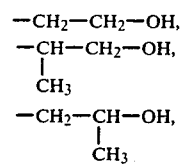

$+CH_2-CH_2-O+_{n_{35}}O-CH_3$ wherein $n_{35}$ is an integer from 1 to 3,

wherein $R_{83}$ and $R_{84}$ are the same or different and are selected from the group consisting of hydrogen, methyl and

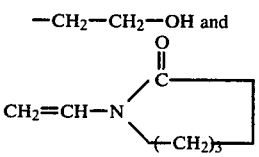 (2)

(3)

(4)

wherein $R_{85}$ and $R_{87}$ are the same or different and are selected from the group consisting of hydrogen and methyl and $R_{86}$ is —CH$_2$—CH$_2$—, and

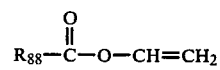 (5)

wherein $R_{88}$ is selected from the group consisting of methyl, ethyl, n-propyl and n-butyl.

The following comonomers may also be used. These are polycyclic esters of acrylic and methacrylic acid, isobornyl acrylate, adamantanyl acrylate, dicyclopentadienyl acrylate, menthyl acrylate and isopinocamphyl acrylate.

The preferred hydrophilic sidechains are as follows:

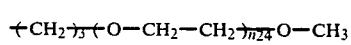

wherein $n_{24}$ is an integer from 2 to 3,

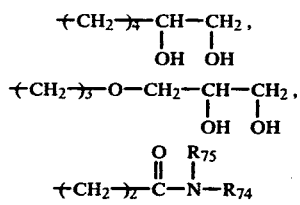

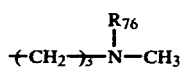

wherein $R_{74}$ and $R_{75}$ are the same or different and are selected from the group consisting of hydrogen, methyl and —CH$_2$—CH$_2$—OH, $$+CH_2\!\!\rightarrow_{\!\!\overline{3}}\!\!-\!\!\underset{\underset{\displaystyle CH_3}{|}}{N}\!\!-\!\!CH_3$$

wherein $R_{76}$ is selected from the group consisting of hydrogen and methyl,

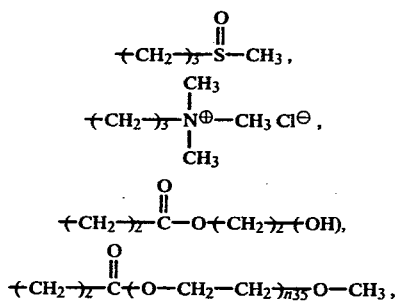

wherein $n_{25}$ is an integer from 2 to 3

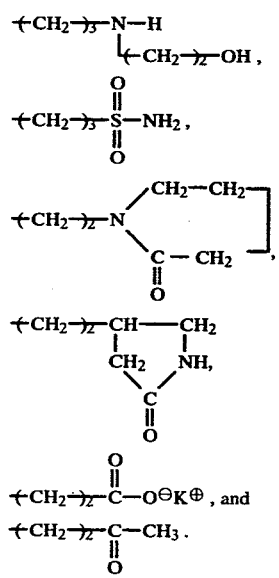

X is preferably the following:

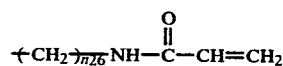

wherein $n_{26}$ is an integer from 1 to about 10,

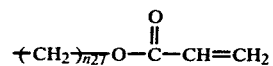

wherein $n_{27}$ is an integer from 1 to about 10,

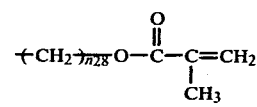

wherein $n_{28}$ is an integer from 1 to about 10 and

wherein $n_{29}$ is an integer from 0 to about 10.

X is more preferably:

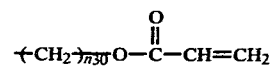

wherein $n_{30}$ is an integer from 3 to 4, and

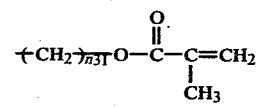

wherein $n_{31}$ is an integer from 3 to 4.

X is most preferably:

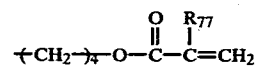

wherein $R_{77}$ is selected from the group consisting of hydrogen and methyl.

Preferably $Y_1$ is methyl and $Y_2$ is phenyl. Most preferably $Y_1$ and $Y_2$ are methyls.

Preferably one of $Z_1$, $Z_2$, $Z_5$ and $Z_6$ is a hydrophilic sidechain and a is equal to 1 to about 1,000, b is equal to zero, c is equal to 1, d is equal to 1 to about 1,000, e is equal to 1 and f is equal to zero.

More preferably when only one of $Z_1$, $Z_2$, $Z_5$ and $Z_6$ is a hydrophilic sidechain, a is equal to about 10 to about 500, b is equal to zero, c is equal to 1, d is equal to about 10 to about 500, e is equal to 1, and f is equal to zero.

Even more preferably when only one of $Z_1$, $Z_2$, $Z_5$ and $Z_6$ is a hydrophilic sidechain a is equal to about 75 to about 150, b is equal to zero, c is equal to one, d is equal to about 25 to about 50, e is equal to one and f is equal to zero.

Most preferably when only one of $Z_1$, $Z_2$, $Z_5$ and $Z_6$ is a hydrophilic sidechain a is equal to about 75, b is equal to zero, c is equal to one, d is equal to about 25, e is equal to one and f is equal to zero.

Most preferably $Z_1$, $Z_2$ and $Z_5$ are methyls and $Z_6$ is selected from the group consisting of

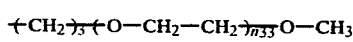

wherein $n_{33}$ is an integer from 2 to 3,

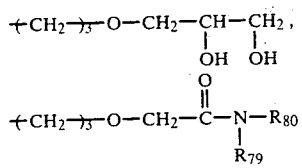

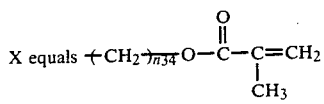

wherein $R_{79}$ is selected from the group consisting of methyl and hydrogen, $R_{80}$ is selected from the group consisting of methyl, hydrogen and $-CH_2-CH_2-OH$, $Y_1$ and $Y_2$ equal methyl and $$X \text{ equals } +CH_2 \xrightarrow{}_{n_{34}} O-\overset{O}{\underset{||}{C}}-\underset{\underset{CH_3}{|}}{C}=CH_2$$

wherein $n_{34}$ is an integer from 3 to 4.

In another preferred embodiment of the instant invention, only one of $Z_1$ through $Z_7$ is a hydrophilic sidechain and a is equal to one, b is equal to about 2 to about 4, c is equal to zero, d is equal to one, e is equal to about 25 to about 500 and f is equal 25 to about 500.

In this embodiment, more preferably when only one of $Z_1$ through $Z_7$ is a hydrophilic sidechain a is equal to one, b is equal to about 2 to about 3, c is equal to zero, d is equal to one, e is equal to about 25 to about 250 and f is equal to about 25 to about 250.

In this same embodiment even more preferably when only one of $Z_1$ though $Z_7$ is a hydrophilic sidechain a is equal to one, b is equal to about 2 to about 3, d is equal to one, c is equal to zero, e is equal to from about 50 to about 100 and f is equal to from about 50 to about 100.

In this same embodiment most preferably when only one of $Z_1$ through $Z_7$ is a hydrophilic sidechain a is equal to one, b is equal to from about 2 to about 3, c is equal to zero, d is equal to one, e is equal to from about 50 to about 75 and f is equal to from about 50 to about 75.

In this same embodiment also most preferably $Z_1$, $Z_2$, $Z_5$, $Z_6$, $Y_1$ and $Y_2$ are methyls, $Z_3$ and $Z_4$ are hydrogens and $$Z_7 \text{ is } +CH_3 \xrightarrow{}_{3} O-CH_2-\underset{\underset{OH}{|}}{CH}-\underset{\underset{OH}{|}}{CH_2},$$

$$\text{and } X \text{ is } +CH_2 \xrightarrow{}_{4} O-\overset{O}{\underset{||}{C}}-\underset{\underset{CH_3}{|}}{C}=CH_2.$$

When there are more than one $Z_1$ on the backbone of the polymer, all of these $Z_1$'s may be the same or different. Also, this applies to $Z_2$ through $Z_7$. For example, the following formula is illustrative of this:

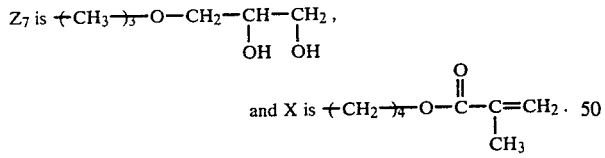

In order to easily locate the Z's, compare the above formula with the broad general formula disclosed herein. In the above formula $Z_1$, $Z_2$, $Z_5$, $Z_6$ and $Z_7$ equal $-CH_3$, all the $Z_4$'s equal hydrogen and there are 250 $Z_3$'s equal to hydrogen and 50 $Z_3$'s equal to

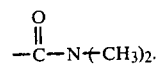

When the terms "activated" or "free radical polymerizably activated" are used with the term "unsaturated groups" herein, it is meant that an unsaturated group which is activated is one which has a substituent which facilitates free radical polymerization. These activated unsaturated groups are polymerized to form the polymers of the instant invention. Preferably, the activating groups used herein lend themselves to polymerization under mild conditions, such as, ambient temperatures.

When the term copolymerization is used herein, it is meant the simultaneous polymerization of two or more monomers. When the term copolymer is used here, it is meant a polymer having at least two different monomers incorporated into the polymer.

When the statement is made "a polysiloxane monomer $\alpha,\omega$ terminally bonded through divalent hydrocarbon groups to polymerizable free radical polymerizably activated unsaturated groups" it is meant that the hydrophilic sidechain containing polysiloxane monomers as described herein have been attached to a compound having a divalent hydrocarbon group, such as methylene or propylene, etc. and then at each end of this compound is attached an activated unsaturated group such as methacryloxy, etc. and this then is the most preferred hydrophilic sidechain containing polysiloxane monomer. The activated unsaturated groups when polymerized form polymers and copolymers which are crosslinked.

When the term monomer is used herein with the term polysiloxanes or hydrophilic sidechain containing polysiloxanes, it is meant to include polysiloxanes endcapped with polymerizable unsaturated groups. Preferably these monomers may be poly (organosiloxane) monomers and polyparaffinsiloxane monomers which contain hydrophilic sidechains. The process of lengthening the siloxane portion of the monomer is referred to herein as siloxane ring insertion. The chain length of the polysiloxane center unit of the monomers may be as high as 1,000 or more.

When the term polymerization is used herein, we refer to the polymerization of the double bonds of the siloxanes endcapped with polymerizable unsaturated groups either alone or copolymerized with other comonomers disclosed herein to form a crosslinked three-dimensional water absorbing polymeric network. This polymerization preferably includes another monomer or mixtures of other monomers in addition to the siloxane monomers.

The relative hardness or softness of the contact lenses of this invention can be varied by decreasing or increasing the molecular weight of the monomer hydrophilic sidechain containing polysiloxane endcapped with the activated unsaturated groups or by varying the percent and type of the comonomer. As the ratio of siloxane units to endcap units increases, the softness of the material increases. Conversely, as this ratio decreases the rigidity and hardness of the material increases.

units results in a product more capable of transporting oxygen as compared with a lower percentage of siloxane units which results in a material with less ability to transport oxygen.

The following polysiloxane synthesis and hydrosilation reaction are the most preferred embodiments:

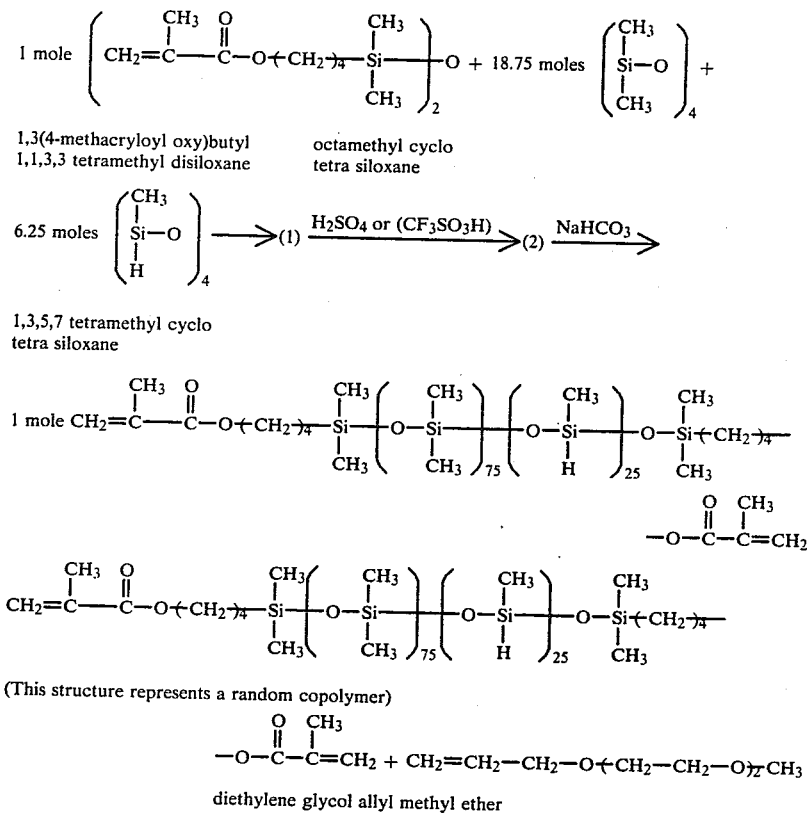

As is well established, the oxygen transportability of polysiloxanes is substantially greater in comparison to the conventional contact lens polymers such as polymethyl methacrylate (PMMA) or polyhydroxyethylmethacrylate (PHEMA). The oxygen transportability of the materials of this invention can be varied by altering the percentage of siloxane units in the polysiloxane monomer. For example, a high percentage of siloxane Triethylene glycol allyl methyl ether and solketal allyl ether may also be used as preferred replacements for the diethylene glycol allyl methyl ether.

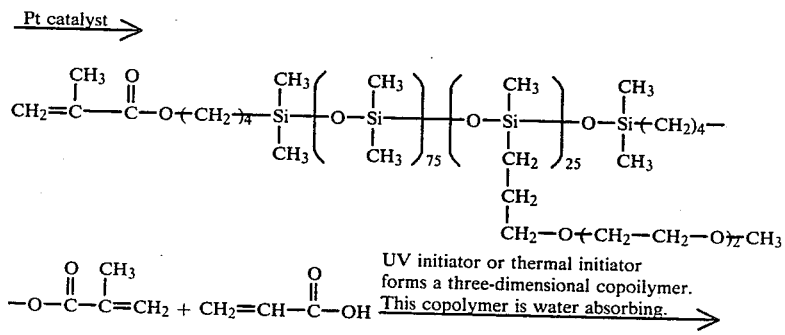

Both octamethyl cyclo tetra siloxane and cyclo tetra siloxane are available from Silar Labs, 10 Alplaus Road, Scotia, NY 12302.

The following is an example of the three-dimensional network copolymer formed herein:

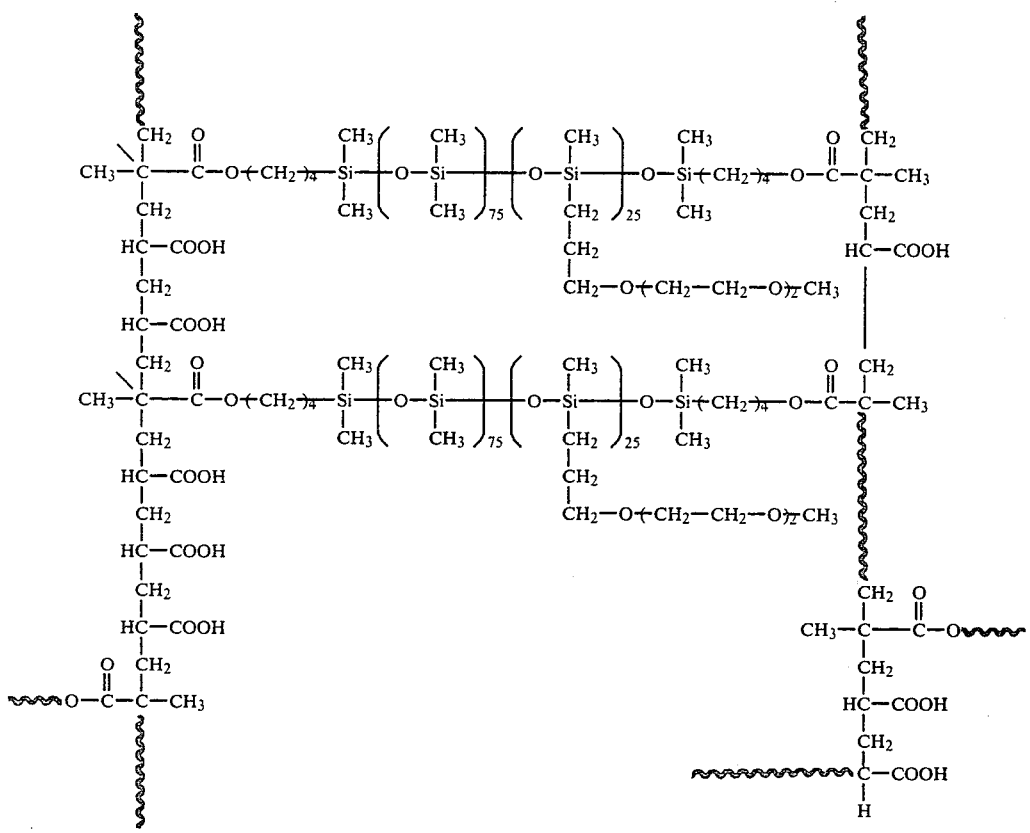

When the above polymer is made into a contact lens and buffered to pH7, the contact lens absorbs water. Another important advantage is that with the hydrophilic sidechain one gets increased compatability between the siloxane and the added comonomers. However, even more importantly the use of the hydrophilic sidechains results in the final product, i.e., the polymer, being more compatible as evidenced by the lack of sufficient scattering of visible light to cause cloudiness.

The number 25 in the above formula may be replaced by the letter d as shown above.

Then d may be 1 to about 1,000, preferably from about 10 to about 500, more preferably from about 25 to about 50 and most preferably 25.

The number 4 in the above formula may be replaced by the letter n as shown above.

Then n may be from 1 to about 10, preferably 1,3 or 4 or more preferably about 3 to about 4.

c is always equal to one in the above formula.

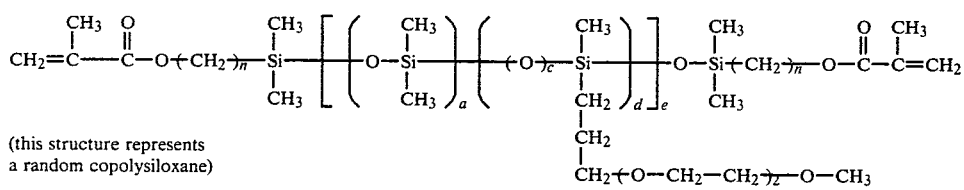

(this structure represents a random copolysiloxane)

The number 75 in the above formula may be replaced by the letter a as shown above. Then a may be 1 to about 1,000, preferably from about 10 to about 500, more preferably from about 75 to about 150 and most preferably 75.

e is always equal to one in the above formula.

f is always equal to zero in the above formula.

In another preferred embodiment, the reaction is as follows:

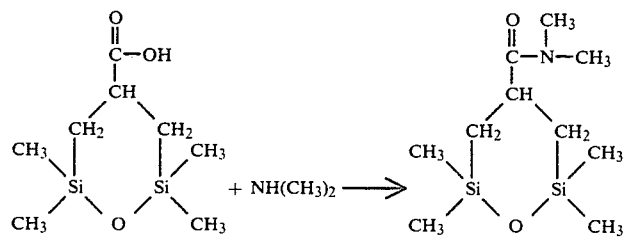

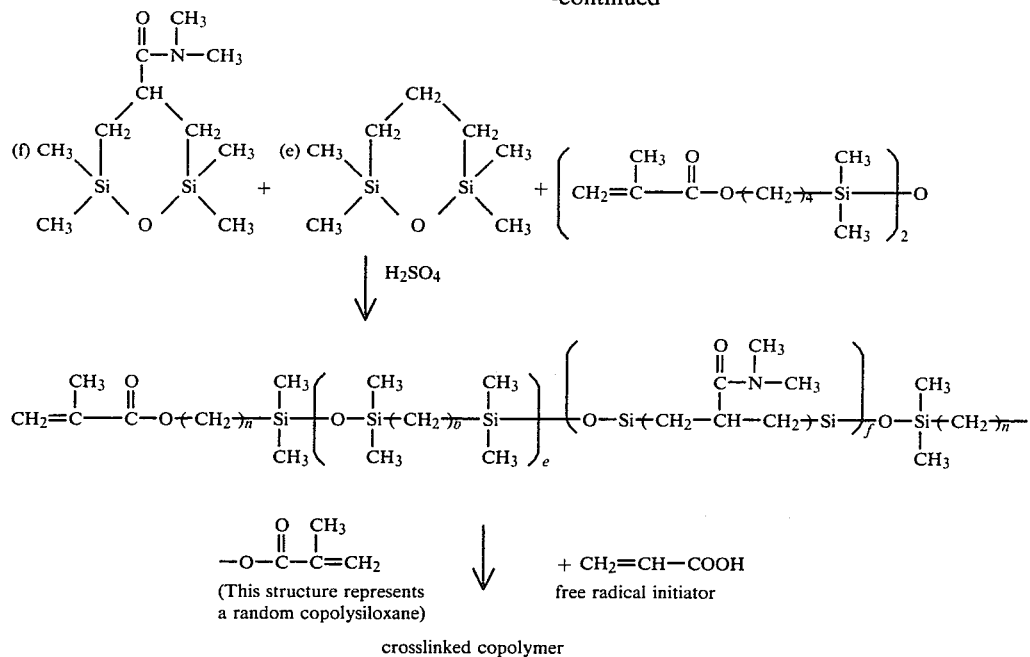
(This structure represents a random copolysiloxane)

crosslinked copolymer ← + CH$_2$=CH—COOH, free radical initiator which, after buffering to a pH of 7, is water absorbing. With the hydrophilic sidechain one gets increased compatability between the siloxane and the added comonomers and the resulting copolymer is more compatible as evidenced by the lack of scattering of visible light.

In the above formula, e and f may be from about 25 to about 500, preferably from about 25 to about 250, more preferably from about 50 to about 100 and most preferably from about 50 to about 75.

In the above formula, b may be from about 2 to about 4 and preferably from about 2 to about 3.

In the above formula, n may be from about 1 to about 10, preferably 1,3 or 4 and more preferably 3 or 4.

These instant monomers when copolymerized can be readily cured to cast shapes by conventional methods such as UV polymerization, or through the use of free radical initiators plus heat. Illustrative of free radical initiators which can be employed are bis(isopropyl) peroxydicarbonate, azobisisobutyronitrile, acetyl peroxide, lauroyl peroxide, decanoyl peroxide, benzoyl peroxide, tertiarybutyl peroxypivalate and the like.

In order to further control some of the properties of the polymers and copolymers of the instant invention, one can polymerize a mixture of the hydrophilic sidechain containing siloxane monomers having a low value of e and f with hydrophilic sidechain containing siloxane monomers having a high value for e and f with themselves or other comonomers disclosed herein. When e and f in the siloxane monomers have a relatively high value, i.e., above 25, the resulting contact lenses or biomedical devices are soft, hydrophilic, water absorbing, oxygen transporting, flexible, hydrolytically stable, biologically inert, transparent, resilient, and do not need fillers to improve the mechanical properties. It is preferred that all the monomers should have a molecular weight low enough so that the viscosity is low enough to spin cast the monomers, e.g., about 20 strokes or below measured in Gardner viscosity tubes.

The advantages of using the instant polymers and copolymers for making the soft contact lens of the instant invention are numerous. However, most importantly and unexpectedly the soft contact lens of the instant invention are not only hydrophilic but water absorbing. As mentioned, the art teaches that polysiloxanes are generally hydrophobic. There are a few exceptions in the art where it is taught that certain polysiloxanes are hydrophilic.

Advantages of using the hydrophilic sidechain containing polysiloxane monomers are (1) polymers made from the hydrophilic sidechain containing polysiloxane monomers, as mentioned, absorb water. As a result of these polymers absorbing water, contact lens made from these water absorbing polymers move on the eye so that no physical damage will occur to the cornea and sufficient tear exchange will occur so that corneal metabolism will proceed normally. Non-movement and eye damage has been generally associated with siloxane contact lens. (2) The use of the instant hydrophilic sidechains which are attached to the instant siloxane backbones greatly increase the compatibility of the siloxane with other comonomers which are used herein. The use of larger amounts of these other comonomers is desirable since these comonomers also add to the water absorbing properties of the instant copolymers. Even more importantly, the use of these hydrophilic sidechains results in the final product, i.e., the polymer, being more compatible as evidenced by the lack of sufficient scattering of light to cause cloudiness in the final product. This cloudiness would result in a contact lens made from this material being not optically clear. (3) The advantages of using activated vinyl terminal groups to cure the hydrophilic sidechain containing siloxane monomers permit rapid cure at preferably room temperature if suitable initiators are used. This is desirable since the preferred method of casting the contact lens is spin casting. (4) No fillers are needed to get useful physical strength as is common with most silicone resins. This is desirable since the use of fillers requires that other possibly undesirable materials be added to the composition in order to match the refractive index of the polymer to that of the filler. (5) Furthermore, the hydrophilic sidechain containing polysiloxane monomers and the copolymers of the instant invention are oxygen transporting. This is important if the material is to be used for contact lenses. The human cornea requires about $2\times10^{-6}$cm$^{-3}$/(sec. cm$^2$atm.) of oxygen through the contact lens as reported by Hill and Fatt, *American Journal of Optometry and Archives of the American Academy of Optometry*, Vol. 47, pg. 50, 1970.

When the terms "oxygen transportability", "oxygen transporting" or "oxygen permeable" are used in the instant application it is meant that the material in the lens will allow sufficient transmission of oxygen through itself to supply the necessary oxygen requirements of the human cornea and other living tissue. The oxygen requirement for the human cornea, as mentioned, is about $2\times10^{-6}$cm$^3$/(sec.cm$^2$atm.). The oxygen transportability was determined by a special test procedure described in conjunction with the examples herein. (6) These soft contact lenses are hydrolytically stable, meaning that when the contact lenses or devices are placed into an aqueous solution, e.g., in the eye, or during the disinfecting step, i.e., water plus heat, the lenses will not change significantly in chemical composition, i.e., hydrolyze and cause the lenses to change shape resulting in an undesirable change in optics (7) The contact lenses of the instant invention are also resilient. When the term "resilient" is used herein it is meant that after the lenses have been deformed the lenses or devices will return quickly to their original shape. (8) The lenses are preferably made by spin casting, e.g., by the method as disclosed in U.S. Pat. No. 3,408,429. Monomers which have extremely high viscosities may present a problem during spin casting. However, generally the higher the molecular weight of the hydrophilic sidechain containing polysiloxane monomers, the more desirable are the oxygen transporting properties. The longer the chain length and the higher the molecular weight the higher the viscosity of the monomers. However, if spin casting is to be used the viscosity of the hydrophilic sidechain containing polysiloxane monomers must be such that these materials can be spin cast. The hydrophilic sidechain containing polysiloxane monomers have viscosities high enough to give all the desirable properties when polymerized but low enough to be spin cast while still in the monomeric form. The preferred weight average molecular weight is from about 4,000 to 60,000 for the hydrophilic sidechain containing polysiloxane monomers of the instant invention. (9) The contact lenses of the instant invention are preferably soft. By the use of the term "soft" in the instant application is meant that the contact lens is capable of being folded or bent back upon itself without breaking.

The most preferred contact lenses of the instant invention, as mentioned, are hydrophilic, water absorbing, have an oxygen transport rate of at least about $2\times10^{-6}$cm$^{-3}$/(sec.cm$^2$atm.), are hydrolytically stable, biologically inert, transparent, resilient, and have a softness preferably of about 60 or below on the Shore hardness A scale. Most preferably the Shore hardness should be 25 to 35 on the A scale. To further illustrate the most preferred contact lenses of the instant invention's physical properties, the tensile modulus of elasticity should be about 500 g/mm$^2$ or less. If the material is to be used as contact lenses then the Shore hardness and modulus may be related to the comfort of the lenses to the wearer when used on the human eye.

Another advantage of the preferred embodiment, i.e., soft contact lenses, of the instant invention is that lenses made from the copolymers of the instant invention can be made large enough to cover the entire cornea of the eye resulting in more comfort. Hard contact lenses, such as PMMA lenses, have to be made smaller due to their poor oxygen transportability. Furthermore, the larger the lenses, the easier it is to locate the optical center of the lenses. The larger the lens the easier it is to maintain the optical axis which is required in making special lenses, e.g., for those persons with astigmatism. Another advantage of the preferred soft lenses of the instant invention is that the instant preferred soft lenses can have a softness similar to HEMA lenses, but in addition, and most importantly, are more oxygen permeable, i.e., are capable of transporting more oxygen and can be made water absorbing to the same extent as the HEMA lenses. HEMA lenses are oxygen permeable but not oxygen permeable to the extent that the HEMA lenses are capable of transporting oxygen to a degree necessary to meet all the requirements of the human cornea.

When the word "oxygen permeable" is used herein, it means that the instant copolymers will transport oxygen at a rate of at least about $2\times10^{-6}$ cm$^3$/(sec.cm$^2$atm.).

While the copolymers of the instant invention can be used to prepare contact lenses these copolymers can also be employed for other uses, such as, shaped articles for use in biomedical applications. These copolymers can be used to make biomedical devices, i.e., shaped articles, such as, dialyzer diaphragms, to prepare artificial kidneys and other biomedical implants, such as disclosed in Wichterle, U.S. Pat. No. 2,976,576 and Wichterle, U.S. Pat. No. 3,220,960. The instant copolymers can also be used in preparing medical surgical devices, e.g., heart valves, vessel substitutes, intrauterine devices, membranes and other films, dialyzer diaphragms, catheters, mouth guards, denture liners and other such devices as disclosed in Shepard U.S. Pat. No. 3,520,949 and Shepard U.S. Pat. No. 3,618,231. The instant copolymers can be used to modify collagen to make blood vessels, urinary bladders and other such devices as disclosed in Kliment U.S. Pat. No. 3,563,925. The instant copolymers can be used to make catheters as disclosed in Shephard U.S. Pat. No. 3,566,874. The copolymers can be used as semipermeable sheets for dialysis, artificial dentures and all of such disclosures as set forth in Stoy U.S. Pat. No. 3,607,848. The instant polymers and copolymers can be used in ophthalmic prostheses and all other uses disclosed in Wichterle U.S. Pat. No. 3,679,504.

When the terms "shaped article for use in biomedical applications" or "biomedical device" are used herein it is meant that the materials disclosed herein have physiochemical properties rendering them suitable for prolonged contact with living tissue, blood or the mucous membrane such as would be required for biomedical shaped articles, such as, surgical implants, blood dialysis devices, blood vessels, artificial ureters, artificial breast tissue and membrane intended to come in contact with body fluid outside of the body, for example, membranes for kidney dialysis and heart/lung machines, and the like. It is known that blood, for example, is rapidly damaged in contact with artificial surfaces. The design of a synthetic surface which is antithrombogenic and nonhemolytic to blood is necessary for prosthesis and devices used with blood. The instant polymers and copolymers are compatible with living tissue.

The copolymers disclosed herein can be boiled and/or autoclaved in water without being damaged whereby sterilization may be achieved. Thus, an article formed from the instant copolymers disclosed herein may be used in surgery where an article compatible with living tissue or with the mucous membrane may be used.

structure is confirmed by infrared spectra, proton magnetic resonance spectra and silicone hydride analysis to be:

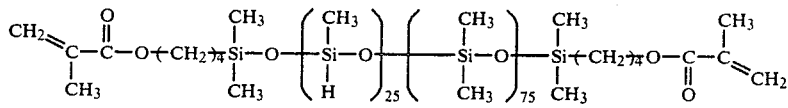

The product is a random copolysiloxane.

The following examples are illustrative only and should not construed as limiting the invention. All parts and percents referred to herein are on a weight basis and all viscosities measured at 25° C. unless otherwise specified.

EXAMPLE I 557 g of 1,3-bis(4-hydroxybutyl)tetramethyl disiloxane, 634 g of dry pyridine and 2 liters of hexane are charged to a 5 liter reaction flask equipped with a mechanical stirrer and drying tube. The mixture is chilled to 0° C. and then 836 g of methacryloyl chloride is added dropwise. The mixture is agitated continuously overnight. The reaction solution is extracted consecutively with 10% water solutions of HCl and NH₃ in order to remove excess reagents and pyridine hydrochloride. The resulting solution of the product in hexane is dried with anhydous MgSO₄, filtered, and solvent removed at reduced pressure. About 459 g (55% yield) of 1,3-bis(4-methacryloxy butyl)tetramethyl disiloxane is collected. The structure is confirmed by infrared spectra, proton magnetic resonance spectra and elemental analysis. IR spectra shows no intense hydroxyl band between 3100 and 3600 cm$^{-1}$ but does show strong methacrylate absorptions at 1640 and 1720 cm$^{-1}$. PMR spectra agreed with the proposed structure.

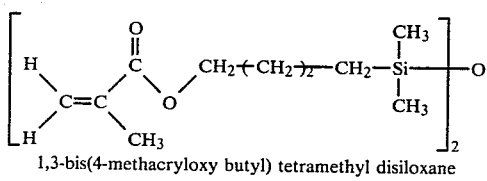

1,3-bis(4-methacryloxy butyl) tetramethyl disiloxane

EXAMPLE II 148.7 g of octamethylcyclotetrasiloxane, available from Silar Labs, 10 Alplaus Road, Scotia, NY 12302, 40.2 g of tetramethylcyclotetrasiloxane, available from Silar Labs, 11.1 g of 1,3-bis(4-methacryoxybutyl) tetramethyl disiloxane as prepared in Example I and 2.0 g of 95%-98% H₂SO₄ are charged, under dry air, to a 500 ml 2-neck reaction flask equipped with a mechanical stirrer. The mixture is agitated contionously for 20 hours at which time 17 g of powdered sodium bicarbonate is added to the reaction mixture and stirred for two hours. The resulting mixture is then diluted with 500 mls of hexane, dried over anhydrous MgSO₄, filtered and the solvent removed at reduced pressure. The cyclics are removed under high vacuum (0.050 mm) at 60° C. for one hour. 180 g of a methacrylate endcapped 25 mole percent silicone hydride polydimethylsiloxane is collected. The polymer is a clear colorless fluid which has a viscosity of 1.1 stokes by Cannon viscometer. The

EXAMPLE III 1,700 mls of dried peroxide free tetrahydrofuran, available from Fisher Scientific Company, 15 Jet View Drive, P.O. Box 8740, Rochester, NY 14624 and 158.7 g potassium metal, available from Fisher Scientific, are charged under dry nitrogen into a 5,000 ml three-neck round bottom flask equipped with mechanical stirrer. The solution is chilled to 10° C., using an icewater bath, and 494 ml of diethylene glycol monomethyl ether, available from Chemical Samples Company, 4692 Kenny Road, Columbus, OH 43221, is added dropwise. The potassium metal reacts within 24 hours at which time 350 mls of allyl chloride available from Aldrich, 159 Forest Street, Metuchen, NJ 08840, is added dropwise at such a rate to maintain a gentle reflux. After the reaction is allowed to continue overnight, one liter of distilled water is added to the reaction vessel to dissolve the precipitated salts. The tetrahydrofuran layer is washed three times with a salt water solution (270 g NaCl to 1 liter H₂O) to remove excess alcohol. The tetrahydrofuran is removed with a water aspirator and the product is distilled at reduced pressure. 410 g of diethylene glycol allyl methyl ether is obtained (b.p. 109° C./30 mm). The analytical data is consistent with a product of the general formula:

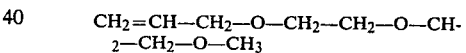

EXAMPLE IV 46.1 g of diethylene glycol allyl methyl ether, as prepared in Example III, followed by 320 mls of hexane, are passed through 42.9 g of activated F-20 alumina, available from Alcoa, Bauxite, AR 72011, into a 1000 ml three-neck flask equipped with mechanical stirrer, thermometer and nitrogen inlet. 40 μl of 20 parts per 1000 Pt solution in the form of H₂ Pt Cl-6H₂O, available from Fisher Scientific, in 2-propanol is added to the mixture. 40 mls of hexane are distilled to remove water and alcohol. The mixture is cooled to 40° C. at which time 40 g of methacrylate endcapped 25 mole percent silicone hydride polydimethylsiloxane, as prepared in Example II, is added. Distillation is continued for one hour at which time the temperature is at 80° C. About 200 mls of hexane have been removed. Infrared spectra at 2175 cm$^{-1}$ shows no remaining silicone hydride band.

The mixture is cooled and diluted with hexane to a total volume of 500 mls. The mixture is divided and added to two slurry packed 600 mm×45 mm fritted silica gel chromatography columns layered with 0.5 cm Celite ® and 1.5 cm sea sand. Each column is eluted with 2000 ml of a 1:1 hexane/ether mixture. This fraction contains the excess allylic ether. Each column is then eluted with 2000 ml of a 1:1 hexane/acetone mixture. This fraction contains the polymer. The resulting solution of the product which is hexane is dried with anhydrous MgSO$_4$, filtered and the solvent is removed at reduced pressure. 45 g of a methacrylate endcapped 25 mole percent silicone 3(diethylene glycol methyl ether) propyl polydimethylsiloxane is obtained. The product is a clear, colorless fluid with a viscosity of 4.0 Stokes by Cannon viscometer. Analytical data confirms structure to be:

buffered saline (oxygen concentration about 8 ppm) is introduced into the second chamber. There is located in the first chamber an oxygen sensing electrode which measures the oxygen concentration in the first chamber. This measures the oxygen permeability of the material covering the passageway between the two chambers. The oxygen permeability of the sample can be calculated from the rate of oxygen concentration change in the first chamber. The unit of oxygen permeability is

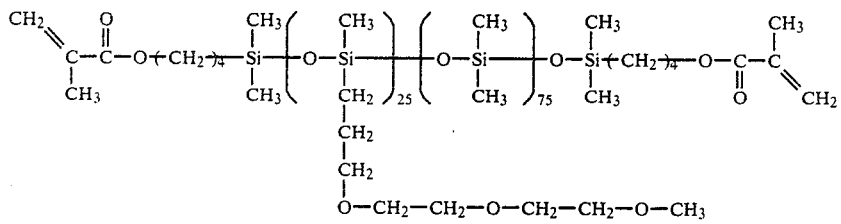

EXAMPLE V

To 72.7 parts of the monomer prepared as in Example IV is added 18.2 parts of isobornyl acrylate, available from Rohm and Haas, Independence Hall West, Philadelphia, PA 19105 and 9.1 parts of acrylic acid and one part diethoxyacetophenone, available from Upjohn, LaPorte, TX 77571. After mixing, a film is cast between glass plates. The film is irradiated with UV light for two hours. The film is released, extracted for four hours in a 1:1 hexane/isopropanol mixture and buffered. This buffering procedure consists of placing the film to be tested, which is about 2″×3″ in size, into 100 cc of 0.1 N ammonium hydroxide for 24 hours. Then the film is soaked in an isotonic phosphate buffer (pH 7.2), i.e., Na$_2$HPO$_4$, NaHPO$_4$ and NaCl for another 24 hours. This buffered saline solution is made by mixing 1.403 g of Na$_2$HPO$_4$, 0.458 g of NaH$_2$PO$_4$ and 8.0 g of NaCl with water to make a final volume of one liter. The film is then stored in an isotonic buffered saline solution (pH 7.2).

The test procedure for determining the percent of water in the film is as follows:

A 0.3 g sample is taken from the above hydrated film. The sample of film is roller dried and immediately weighed to the nearest milligram. The weighed film is placed into a vacuum oven (1 cm Hg) overnight at 80° C. Then the material is cooled and the vacuum broken by admitting dry air. After the sample is at room temperature for about 15 minutes, the sample is weighed to the nearest milligram. The percent water is calculated as follows:

Percent Water=(Wet Weight-Dry Weight/Wet Weight×100

The percent water for the above sample is 18%.

The oxygen permeability of the above sample, in the buffered form, is determined by the following technique:

The test is measuring the oxygen permeability of a material while it is wet with the buffered saline solution. This is an attempt to simulate the conditions of a contact lens when on the human eye. Two chambers filled with buffered saline at 32° C. are connected together by a common passageway. Across this passageway is placed the material to be tested. The oxygen concentration in the first chamber is lowered by bubbling nitrogen gas into the second chamber until the oxygen concentration in the first chamber is below about 0.1 ppm. Aerated (c.c. (S.T.P.) cm/Sec. cm$^2$ mm Hg.

The oxygen permeability of the above sample is $6.7 \times 10^{-10}$ cc cm/sec.cm$^2$ mmHg which is 8.2 times more oxygen permeable than the control material PHEMA, polyhydroxyethylmethacrylate, i.e., HEMA hydrogel.

The following physical properties are measured on an Instron tester ASTM D1708 using standard "dogbone" samples cut from 0.2 mm thick films. This test is used on all the examples where tensile strength, modulus and elongation are measured. The film tested is in the hydrated buffered form.

Tensile Strength—36 g/mm$^2$
Tensile Modulus—72 g/mm$^2$
Elongation—84%

EXAMPLE VI 72.7 parts of the monomer as prepared in Example IV are mixed with 18.2 parts of isobornyl acrylate and 9.1 parts of acylic acid and one part diethoxyacetophenone. 30 μl of the mixture is placed in a suitable contact lens spincasting mold and a contact lens is prepared as taught in U.S. Pat. No. 3,408,429. After two hours irradiation with UV light, a cured contact lens is obtained. The lens formed is soft, water absorbing, hydrophilic, optically clear, elastic and strong. The lens was worn during clinical testing without trauma for 24 hours by a monkey.

EXAMPLE VII 66.7 parts of the monomer is prepared in Example IV are mixed with 16.7 parts isobornyl acrylate and 16.7 parts acrylic acid and one part diethoxyacetophenone. A film is prepared, extracted and buffered by the procedure as taught in Example V. The percent water of the film is 46%. The film is soft, water absorbing, hydrophilic and optically clear.

EXAMPLE VIII 30.8 parts of the monomer is prepared in Example IV is mixed with 7.7 parts isobornyl acrylate and 61.5 parts of acrylic acid and one part diethoxyacetophenone. A film is prepared, extracted and buffered by the same procedure as taught in Example V. The percent water is 84%. The film is soft, water absorbing hydrophilic and optically clear.

EXAMPLE IX

In contrast, 61.5 parts of a methacrylate endcapped polydimethysiloxane as prepared in Example VI of Deichert et al, U.S. Pat. No. 4,153,641, is mixed with 15.4 parts isobornyl acrylate and 23.1 parts acrylic acid and one part diethoxyacetophenone. A film is prepared by the same procedure as taught in Example V. Distinct phase separation occurs, as evidenced by the fact that the film is quite cloudy.

EXAMPLE X 45.5 parts of the monomer as prepared in Example IV are mixed with 9.1 parts isobornyl acrylate and 45.5 parts hydroxypropylacrylate available from Pfaltz & Bauer, 375 Fairfield Avenue, Stamford, CT 06902, and one part diethoxyacetophenone. A film is prepared by the same procedure as taught in Example V, extracted in 1:1 hexane/isopropanol and hydrated in distilled water for two days. The percent water is measured, using the same procedure as taught in Example V. The percent water is 30%. The film is soft, water absorbing, hydrophilic and optically clear. Physical properties and oxygen permeability are measured also using the same procedure as taught in Example V. The film tested is in the hydrated form.

Tensile Strength—54 g/mm$^2$
Tensile Modulus—68 g/mm$^2$
Elongation—122%

The oxygen permeability is measured in buffered saline and is $7.3 \times 10^{-10}$ cc-cm/sec-cm$^2$-mm Hg or 9 times more oxygen permeable than the control material (PHEMA) polyhydroxyethyl methacrylate.

EXAMPLE XI

In contrast, 80 parts of a methacrylate endcapped polydimethylsiloxane as prepared in Example VI of Deichert et al, U.S. Pat. No. 4,153,641 is mixed with 20 parts isobornyl acrylate and 10 parts hydroxypropyl acrylate and one part diethoxyacetophenone. A film is prepared by the same procedure as taught in Example V. Phase separation occurs, as evidenced by the fact that the film is quite cloudy.

EXAMPLE XII 50 parts of the monomer as prepared in Example IV is mixed with 50 parts of distilled N-vinyl pyrolidone available from Aldrich and one part diethoxyacetophenone. A film is prepared and extracted by the same procedure as taught in Example V. The film is hydrated two days in distilled water. The water content is measured also by the same procedure as taught in Example V. The percent of water is 40%. The film is soft, water absorbing, hydrophilic and optically clear.

EXAMPLE XIII 100 parts of the monomer as prepared in Example IV is mixed with 60 parts of N,N-dimethyl acrylamide available from Monomer-Polymer & Dajac Laboratories, Inc., 36 Terry Drive, Trevose, PA 19047, and one part diethoxyacetophenone. A film is prepared, extracted and the percent water determined after two days hydration in distilled water by the same procedure as taught in Example V. The water content is 30%. The film is soft, water absorbing, hydrophilic and optically clear.

EXAMPLE XIV 540 mls of dried peroxide free tetrahydrofuran and 21.5 g of potassium metal are charged into a 2000 ml three-neck flask equipped with mechanical stirrer and a dry nitrogen inlet. 88.4 ml of triethylene glycol monomethyl ether, available from Chemical Samples Co., is added to the mixture dropwise. After the potassium metal has completely reacted, 48.6 ml of allyl chloride is added dropwise to the mixture at such a rate in order to maintain a gentle reflux. After the reaction is complete, 500 mls of distilled water are added in order to dissolve the precipitated salt. The tetrahydrofuran layer is washed with salt water (270 g NaCl/1 liter water) in order to remove the excess alcohol. The resulting product in tetrahydrofuran is collected and the tetrahydrofuran is removed with a water aspirator. The product is distilled at reduced pressure. 75.5 g (74% yield) of triethylene glycol allyl methyl ether is obtained (b.p. 97° C.–100° C./ 2 mm.). The analytical data is consistent with a product of the general formula:

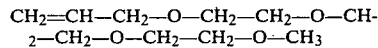

$CH_2=CH-CH_2-O-CH_2-CH_2-O-CH_2-CH_2-O-CH_2-CH_2-O-CH_3$

EXAMPLE XV 58.8 g of triethylene glycol allyl methyl ether, as prepared in Example XIV, followed by 320 mls of hexane are passed through 54.7 g of activated F-20 alumina into a 1000 ml three-neck flask equipped with mechanical stirrer, thermometer and a dry nitrogen inlet. 40 μ of 20 ppt Pt in 2-propanol is added to the mixture. The mixture is warmed and dried by azeotropic distillation. The mixture is cooled to 40° C. at which time 40 g of the methacrylate endcapped 25 mole percent hydride polysiloxane as prepared in Example II is added. Slow distillation is continued for one hour at which time the mixture temperature is 80° C. and about 200 mls of hexane have been removed. Infrared spectra shows that the reaction is complete. The polymer is purified by precipitation from a 1:1 mixture of methanol and water. Analytical data confirms the structure to be:

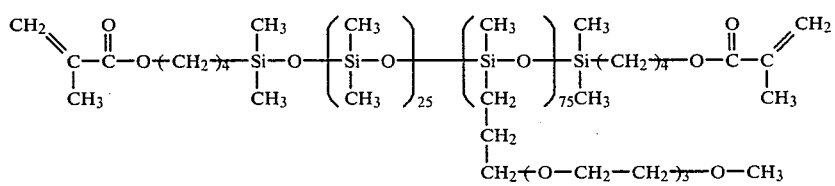

EXAMPLE XVI 72.7 parts of the monomer prepared in Example XV is mixed with 18.2 parts of isobornyl acrylate and 9.1 parts of acrylic acid and one part diethoxyacetophenone. A film is prepared, extracted and buffered the same as described in Example V. A soft, water absorbing, hydrophilic, optically clear film is obtained.

EXAMPLE XVII 1200 mls of dried peroxide free tetrahydrofuran and 100 g of potassium metal are changed into a 3000 ml three-neck flask equipped with mechanical stirrer, thermometer and a dry nitrogen inlet. 317.7 mls of solketal, available from Aldrich, is added dropwise. After reacting overnight, the potassium metal is reacted completely. 188.5 mls of allyl chloride is added dropwise at such a rate to maintain a gentle reflux. After reacting the mixture again overnight, 850 mls of distilled water are added to dissolve the precipitated salt. The tetrahydrofuran (THF) layer is washed with a salt water solution to remove excess solketal. The resulting product in THF is collected and the THF removed with a water aspirator. The product is distilled at reduced pressure. 261.4 mls. of solketalallylether (b.p. 76° C./14 mm) is obtained. Analytical data confirms structure to be:

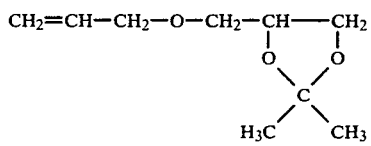

EXAMPLE XVIII 49.5 g of solketalallylether as prepared in Example XVII followed by 320 mls of hexane are passed through 46.1 g of activated F-20 alumina into a 1000 ml three-neck flask equipped with mechanical stirrer, thermometer and a nitrogen inlet. 40 μl of 20 ppt Pt in 2-propanol is added to the mixture followed by azeotropic distillation to remove alcohol and water. The charge is cooled to 40° C. and 40 g of the methacrylate endcapped 25 mole percent hydride polysiloxane prepared as in Example II is added. Slow distillation continues for one hour during which time the mixture temperature increases to 80° C. and about 200 mls of hexane are removed. Infrared spectra confirms the reaction is complete. The polymer is purified by precipitation from a 1:1 mixture of water and methanol. Analytical data confirms the structure to be:

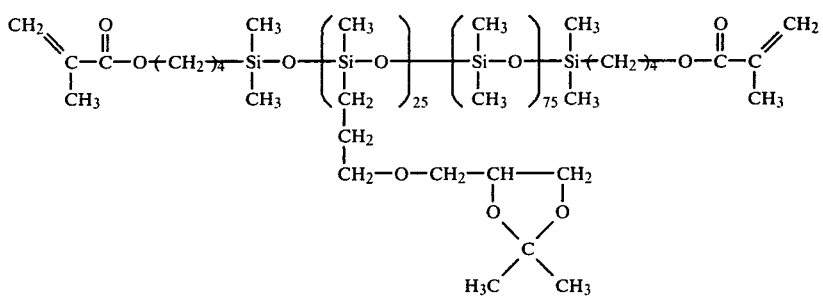

EXAMPLE XIX 5.0 g of the polymer as prepared in Example XVIII, 52 mls of glacial acetic acid available from Fisher, and 4.2 mls of distilled water are charged to a 100 ml round bottom flask and heated to 50° C. overnight at which time the acetic acid and acetone formed during reaction and water are removed under high vacuum. Infrared shows a large hydroxyl bond and the ketal doublet at 1380 cm$^{-1}$ is gone. The polymer is a clear fluid material of the following structure:

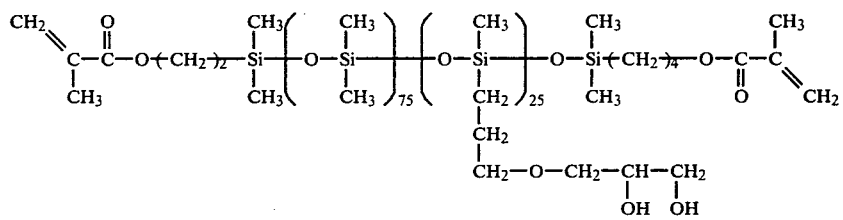

EXAMPLE XX 72.7 parts of the polymer as prepared in Example XIX is mixed with 18.2 parts of isobornyl acrylate and 9.1 parts of acrylic acid and one part diethoxyacetophenone. A film is prepared, extracted and buffered as described in Example V. A soft, water absorbing, hydrophilic, optically clear film is obtained.

EXAMPLE XXI 34.9 g of O-trimethylsilyl allyl alcohol available from Petrarch Inc., P.O. Box 141, Levittown, PA 19059, 40 μl of 20 ppt Pt in 2-propanol and 320 mls of hexane are charged into a 1000 ml three-neck flask equipped with a mechanical stirrer, a nitrogen inlet and a thermometer. The mixture is warmed to reflux and dried by azeotropic distillation followed by cooling to 40° C. 40 g of the methacrylate endcapped 25 mole percent silicone hydride polysiloxane as prepared in Example II is added. Distillation is continued for one hour during which time the mixture temperature increases to 80° C. and about 200 mls of hexane are removed. Infrared spectra confirms that the reaction is complete. The polymer is purified by precipitation from a 1:1 mixture of methanol and water. A clear fluid polymer is obtained having the following structure as confirmed by analytical data:

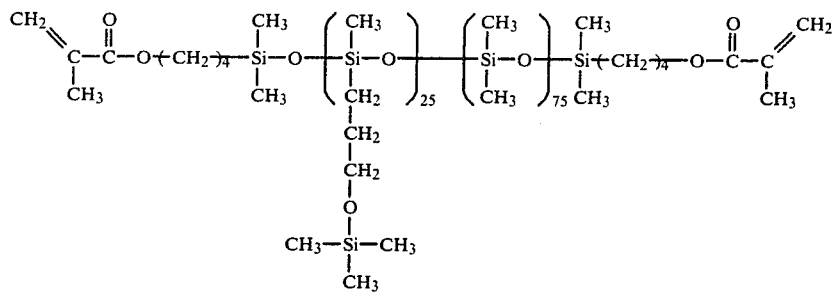

EXAMPLE XXII 5.0 g of the polymer prepared in Example XXI, 52 mls of glacial acetic acid and 4.2 mls of distilled water are charged to a 100 ml flask and heated to 50° C. overnight at which time the acetic acid and water are removed under high vacuum. Infrared shows a large hydroxyl bond. The polymer is a clear fluid material of the following structure:

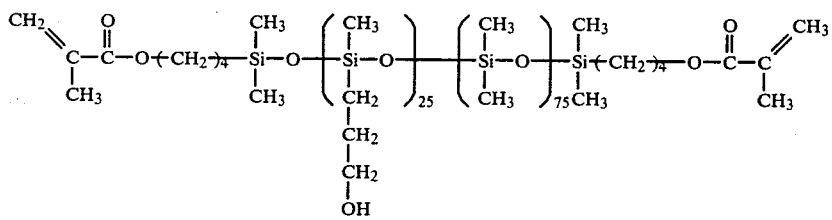

EXAMPLE XXIII 72.7 parts of the polymer as prepared in Example XXII are mixed with 18.2 parts of isobornyl acrylate and 9.1 parts of acrylic acid and one part diethoxyacetophenone. A film is prepared, extracted and buffered as described in Example V. A soft, water absorbing, hydrophillic, optically clear film is obtained.

EXAMPLE XXIV

In a 2 liter, three-necked flask fitted with mechanical stirrer, reflux condensor and a dropping funnel is placed 714 g of 2-allyl oxyethanol available from Haven Chemical Co., 5000 Langdon Street, Philadelphia, PA 19124. 600 g of phosphorous tribromide is added to the mixture dropwise while stirring. This is done over a period of about two hours. The temperature is permitted to rise until the reaction mixture gently refluxes. The mixture is then distilled and the distillate below 160° C. is collected in a 2-liter flask with 1 liter of distilled water. The crude 2-allyloxyethylbromide is dried over calcium chloride and distilled. Pure 2-allyloxyethylbromide is obtained.

750 mls of dried peroxide free tetrahydrofuran and 14.9 g of potassium metal are charged under dry nitrogen into a 2000 ml three-neck flask equipped with mechanical stirrer, condensor and an addition funnel. 55 g of solketal is added dropwise. Potassium metal reacts completely within 24 hours at which time 68.9 g of the 2-allyloxyethylbromide is added at such a rate as to maintain a gentle reflux. After an overnight reaction, 500 mls of distilled water are added to the reaction vessel to dissolve the precipitated salts. The THF is then removed with a water aspirator. The product is distilled at a reduced pressure. Pure 2-allyloxyethyl solketal is obtained. Analytical data confirms structure to be:

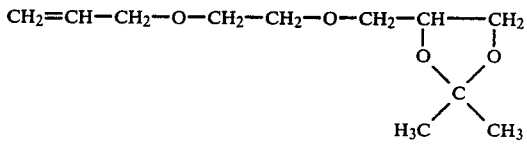

EXAMPLE XXV 62.2 g of the 2-allyloxyethylsolketal as prepared in Example XXIV followed by 320 mls of hexane is passed through 57.9 g of activated F-20 alumina into a three-neck flask equipped with mechanical stirrer and a dry nitrogen inlet. 40 μl of 20 ppt Pt in 2-propanol is added to the mixture. 40 mls of hexane are distilled to remove water and alcohol. The mixture is cooled to 40° C., at which time 40 g of the methacrylate endcapped hydride polydimethylsiloxane as prepared in Example II is added. Distillation is continued for one hour at which time the mixture temperature is 80° C. About 200 mls of hexane are removed. Infrared spectra at 2175 cm$^{-1}$ confirms the reaction is complete. The polymer is purified by precipitation from a 1:1 methanol/water mixture. A clear fluid polymer is obtained. Analytical data confirms the structure to be:

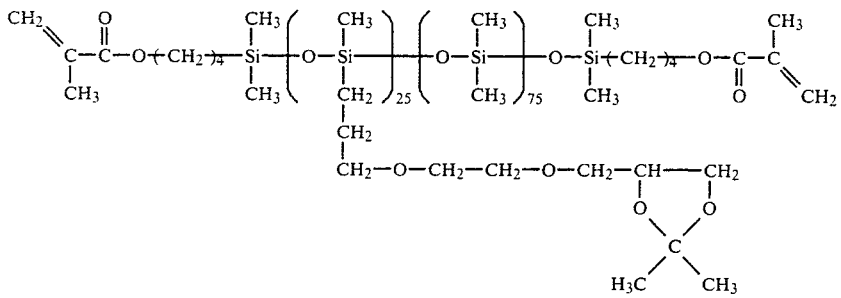

EXAMPLE XXVI 5.0 g of the polymer as prepared in Example XXV, 52 mls of glacial acetic acid and 4.2 mls of distilled water are charged to a 100 flask and heated to 50° C. overnight. Then the acetic acid, water and acetone formed are removed under high vacuum. Infrared shows a large hydroxyl band and the ketal doublet at 1380 cm$^{-1}$ is gone. A clear fluid material of the following structure is obtained:

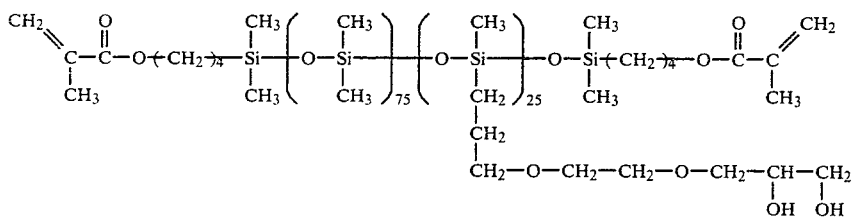

EXAMPLE XXVII 72.7 parts of the polymer as prepared in Example XXVI is mixed with 18.2 parts of isobornyl acrylate and 9.1 parts of acrylic acid and one part diethoxyacetophenone. A film is prepared, extracted and buffered the same as described in Example V. A soft, water absorbing, hydrophilic, optically clear film is obtained.

EXAMPLE XXVIII 163.3 g of allyl alcohol available from Aldrich in one liter of toluene is charged under dry nitrogen to a 5-liter three-necked flask fitted with a mechanical stirrer and a reflux condensor. 100 g of potassium metal are added, stirring begins and the charge is heated in an oil bath until the mixture refluxes gently.

After the reaction mixture has refluxed for 15 hours, the temperature of the oil bath is lowered to 85° C.–90° C., at which time a warm solution of 95 g of monochloracetic acid in 800 mls of toluene is added at such a rate to maintain a gentle reflux. A precipitate of potassium chloroacetate forms. After all the chloroacetic acid is added the mixture is refluxed and stirred for 48 hours.

When the reaction is complete, the flask is cooled and the reaction mixture is transferred to a 5-liter separatory funnel and extracted with three one-liter portions of water. The water extract is acidified with 20% HCl. The crude allyl-oxyacetic acid that is produced is extracted three times with ether. The ether extracts are combined and the solvent removed by distillation on a steam bath. The residue is then fractionally distilled under reduced pressure. Pure allyloxyacetic acid is obtained.

200 g of thionyl chloride is charged to a one-liter three-neck flask equipped with a 250 ml dropping funnel, an efficient condensor and a mechanical stirrer. To this mixture is added dropwise and with rapid stirring, 116 g of allyloxyacetic acid. An evolution of hydrogen chloride and sulfur dioxide takes place. When all the acid has been added, the mixture is heated to 80° C. and kept at this temperature for two hours. Then the remaining thionyl chloride is removed on steam bath under reduced pressure. The crude acid chloride is obtained.

In a one-liter flask, equipped with mechanical stirrer and a 500 ml dropping funnel and surrounded by an ice salt freezing mixture, is placed 0.5 l of 28% cold, concentrated aqueous dimethylamine available from Aldrich. The crude acid chloride is added to this mixture slowly while stirring. Stirring is continued for one hour after the addition of the acid chloride. The aqueous mixture is extracted three times with 250 mls of diethyl ether in order to collect the amide which forms. The collected ether is removed by heating the mixture of a steam bath. Then the product is fractionally distilled at reduced pressure. Pure allyloxy N,N-dimethyl acetamide is obtained. Analytical data confirms the structure to be:

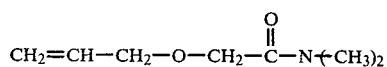

EXAMPLE XXIX 41.1 g of the allyloxyacetamide as prepared in Example XXVIII followed by 320 mls of hexane are passed through 38.3 g of activated F-20 alumina into a 1000 ml three-neck round bottom flask equipped with mechanical stirrer and a nitrogen inlet. 40 μl of 20 ppt Pt in 2-propanol is added to the mixture followed by azeotropic distillation in order to remove water and alcohol. The mixture is cooled to 40° C. at which time 40 g of the methyacrylate endcapped 25 mole percent silicone hydride polydimethylsiloxane as prepared in Example II is added to the mixture. Distillation continues for one hour during which time the mixture temperature is increased to 80° C. resulting in about 200 mls of hexane being removed. Infrared spectra confirms the reaction is complete.

The polymer is purified by precipitation from a 1:1 mixture of water and methanol. Analytical data confirms the structure to be:

in Example XXXI, 87 g of 1,1,3,3-tetramethyl-1,3-disila-2-oxacyclohexane, available from Silar Laboratories, 10 Alplaus Road, Scotia, NY 12302 and 4.14 g of 1,3-bis(4-methacryloxy butyl) tetramethyl disiloxane, as prepared in Example I are combined in a 250 ml flask. While vigorously stirring 1.52 g of trifluoromethane sulfonic acid is added. The reaction is stirred for 12 hours. Then

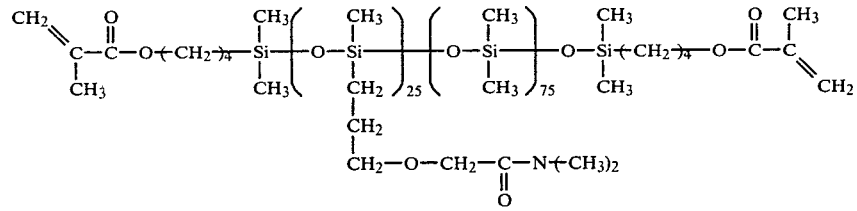

EXAMPLE XXX 72.7 parts of the polymer as prepared in Exampel XXIX are mixed with 18.2 parts of isobornyl acrylate and 9.1 parts of acrylic acid and one part diethoxyacetophenone. A film is prepared, extracted and buffered as described in Example V. A soft, water absorbing, hydrophilic, optically clear film is obtained.

EXAMPLE XXXI

To 218 g (1.0 mole) of 1,1,3,3-tetramethyl-1,3-disila-2-oxacyclohexnae-5-carboxylic acid (synthesized according to the procedure of Omer. W. Steward and Leo. H. Sommer, *J. of Organic Chem.*, vol. 26, pg. 4132, [1961]), in 1000 ml of anhydrous tetrahydrofuran, cooled to −15° C., is added (under anhydrous conditions) 101 g of triethylamine and 108.5 g of ethyl chloroformate. After stirring for 15 minutes, dimethylamine is bubbled through the solution at −15° C. for thirty minutes. The solvent is then removed at reduced pressure. Then 1000 ml of diethylether and 100 ml of water is added. The ether phase is separated, extracted with 0.1N aqueous NaHCO₃, 0.1N aqueous HCl and dried with MgSO₄. After filtering, the ether is removed to give the cyclic siloxane amide of the formula.

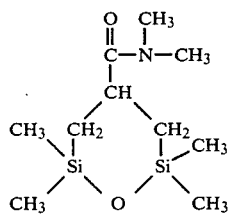

This material is of sufficient purity such that no further purification is necessary.

EXAMPLE XXXII 122.5 g of 1,1,3,3-tetramethyl-1,3-disila-2-oxacyclohexane-5-(N,N-dimethyl carboxamide), as prepared 10 g of NaHCO₃ is added. The product is pressure filtered to give a random copolysiloxane represented by the average formula.

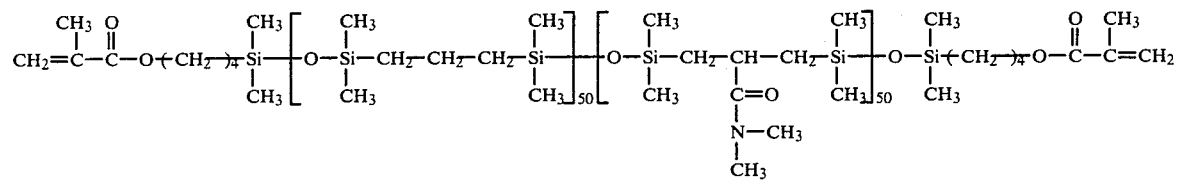

EXAMPLE XXXIII 72.7 parts of the monomer as prepared in Example XXXII are mixed with 18.2 parts of isobornyl acrylate and 9.1 parts of acrylic acid and one part diethoxyacetophenone. A film is prepared, extracted and buffered the same as described in Example V. A soft, water absorbing, hydrophilic, optically clear film is obtained.

We claim:

1. A water absorbing, soft, hydrophilic, flexible, fillerless, hydrolytically stable, biologically inert, contact lens with the capability of transporting oxygen sufficiently to meet the requirements of the human cornea comprising (A) a polysiloxane monomer having the following formula:

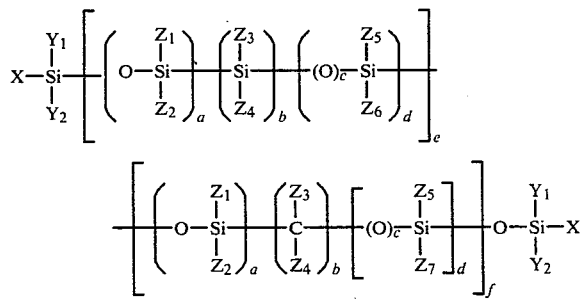

wherein

Y₁ and Y₂ equal the same or different and are selected from the group consisting of a hydrocarbon having from 1 to 20 carbon atoms and a halogenated hydrocarbon having from 1 to 20 carbon atoms, X is a polymerizable, free radical polymerizably activated, unsaturated group bonded through a divalent hydrocarbon group, a is at least 1, b is zero or at least 2, c is 1 if b is zero and c is zero if b is at least 2, d is at least 1, except when b is zero and a is 1 then d is zero or greater, e is at least 1 and f is zero or greater, $Z_1$ through $Z_7$ are the same or different and at least one of $Z_1$-$Z_7$ is a hydrophilic sidechain and $Z_1$ through $Z_7$ are selected from the group consisting of a monovalent hydrocarbon having from 1 to 20 carbon atoms, a halogenated monovalent hydrocarbon having from 1 to 20 carbon atoms and a hydrophilic sidechain with the following formulas selected from the group consisting of

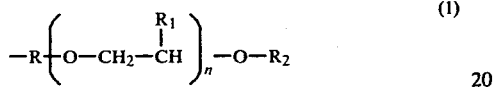  (1)

wherein R is a divalent hydrocarbon having from 1 to 10 carbon atoms, $R_1$ is selected from the group consisting of methyl and hydrogen, $R_2$ is selected from the group consisting of hydrogen, a monovalent hydrocarbon having from 1 to 10 carbon atoms,

wherein $R_3$ is selected from the group consisting of a monovalent hydrocarbon having from 1 to 10 carbon atoms and hydrogen, and n is at least 1,

  (2)

wherein $R_4$ is a hydrocarbon having from 1 to 20 carbon atoms and a valence of $n_1+1$, $n_1$ is at least 1 and there cannot be an —OH group on an aliphatic carbon atom beta to the Si atom and there can be no more than one oxygen atom on any one carbon atom,

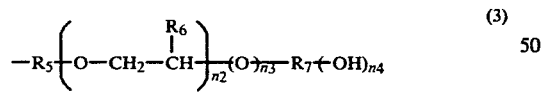  (3)

wherein $R_5$ is a divalent hydrocarbon having from 1 to 10 carbon atoms, $R_6$ is selected from the group consisting of hydrogen and methyl and $R_7$ is a hydrocarbon having from 1 to 20 carbon atoms and a valence of $n_4+1$ and can have no more than 1 oxygen atom attached to any one carbon atom, $n_2$ is zero or greater, $n_3$ is an integer from zero to 1 and $n_4$ is at least 1,

  (4)

wherein $R_8$ is a divalent hydrocarbon having from 2 to 10 carbon atoms and the

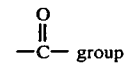 group is not attached to a carbon atom of $R_8$ which is alpha to the Si atom, $R_9$ and $R_{10}$ can be the same or different and are selected from the group consisting of a monovalent hydrocarbon having from 1 to 10 carbon atoms, hydrogen,

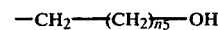

wherein $n_5$ is an integer from 1 to 3 and

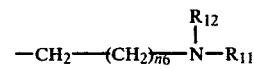

wherein $R_{11}$ and $R_{12}$ are the same or different and are selected from the group consisting of hydrogen and a monovalent hydrocarbon having from 1 to 10 carbon atoms and $n_6$ is an integer from 1 to 5,

  (5)

wherein $R_{13}$ is a divalent hydrocarbon having from 1 to 20 carbon atoms and $R_{14}$ and $R_{15}$ are the same or different and are selected from the group consisting of hydrogen and a monovalent hydrocarbon having from 1 to 10 carbon atoms,

  (6)

wherein $R_{16}$ is a divalent or trivalent hydrocarbon having from 1 to 10 carbon atoms and the S atom is not attached to $R_{16}$ by an aliphatic carbon atom beta to the Si atom, $R_{16}$ may or may not be attached to $R_{17}$ to form a ring which contains more than 3 carbon atoms and $R_{17}$ is selected from the group consisting of a hydrocarbon having from 1 to 10 carbon atoms and -O$^\ominus$ M$^\oplus$ where M is selected from the group consisting of a monovalent metal ion and a quaternary ammonium ion, and $n_7$ is an integer from 1 to 2,

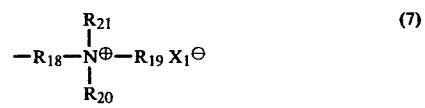  (7)

wherein $R_{18}$ is a divalent hydrocarbon having from 3 to 10 carbon atoms and the N$^\oplus$ must be attached to a carbon atom of $R_{18}$ which is at least 2 carbon atoms away from the Si atom, $R_{19}$, $R_{20}$ and $R_{21}$ are the same or different and are monovalent hydrocarbons having from 1 to 10 carbon atoms, $X_1^\ominus$ is a monovalent anion selected from the group consisting of halides, $R_{22}$—COO$^\ominus$ wherein $R_{22}$ is selected from the group consisting of hydrogen, a monovalent hydrocarbon having from 1 to 10 carbon atoms and a halogenated monovalent hydrocarbon having from 1 to 10 carbon atoms and $R_{23}-SO_3^{\ominus}$ wherein $R_{23}$ is selected from the group consisting of a monovalent hydrocarbon having from 1 to 10 carbon atoms and a halogenated monovalent hydrocarbon having from 1 to 10 carbon atoms,

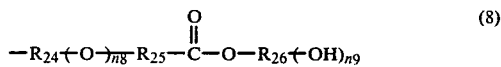
(8)

wherein $R_{24}$ is a divalent hydrocarbon having from 1 to 10 carbon atoms and $n_8$ is an integer from 0 to 1 and when $n_8$ is 1 the oxygen cannot be attached to an aliphatic carbon atom in $R_{24}$ which is beta to the Si atom, $R_{25}$ is a divalent hydrocarbon having from 1 to 10 carbon atoms, $R_{26}$ is a hydrocarbon having from 2 to 20 carbon atoms and a valence of $n_9+1$ and can have no more than 1 oxygen atom attached to any one carbon atom and $n_9$ is at least 1,

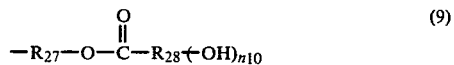
(9)

wherein $R_{27}$ is a divalent hydrocarbon having from 1 to 10 carbon atoms and the oxygen atom bonded to $R_{27}$ cannot be attached to an aliphatic carbon atom in $R_{27}$ which is beta to the Si atom, $R_{28}$ is a hydrocarbon having from 1 to 20 carbon atoms and a valence of $n_{10}+1$ and can have no more than 1 oxygen atom attached to any one carbon atom and $n_{10}$ is an integer of at least 1,

(10)

wherein $R_{29}$ is a divalent hydrocarbon having from 1 to 10 carbon atoms,

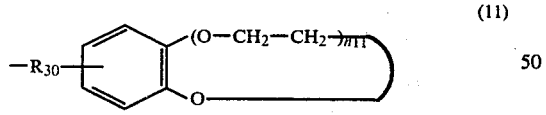
(11)

wherein $R_{30}$ is a divalent hydrocarbon having from 0 to 10 carbon atoms and $n_{11}$ is an integer from 1 to 10,

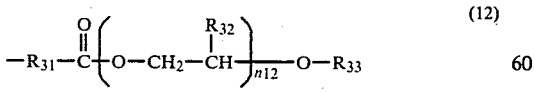
(12)

wherein $R_{31}$ is a divalent hydrocarbon having from 2 to 10 carbon atoms and the carbonyl group is not attached to a carbon atom alpha to the Si atom, $R_{32}$ is selected from the group consisting of methyl and hydrogen, $R_{33}$ is selected from the group consisting of hydrogen, a monovalent hydrocarbon having from 1 to 10 carbon atoms and

wherein $R_{34}$ is a monovalent hydrocarbon having from 1 to 10 carbon atoms and $n_{12}$ is at least 1,

(13)

wherein $R_{35}$ is a divalent hydrocarbon having from 1 to 10 carbon atoms, $R_{36}$ and $R_{37}$ can be the same or different and are selected from the group consisting of hydrogen, monovalent hydrocarbons having from 1 to 10 carbon atoms and

where $n_{13}$ is 2 to 4,

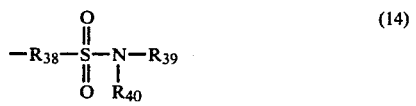
(14)

wherein $R_{38}$ is a divalent hydrocarbon having from 1 to 10 carbon atoms and the S atom cannot be attached to a carbon atom of $R_{38}$ which is alpha to the Si atom, $R_{39}$ and $R_{40}$ can be the same or different and are selected from the group consisting of hydrogen and a monovalent hydrocarbon having from 1 to 10 carbon atoms,

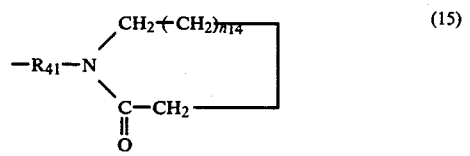
(15)

wherein $R_{41}$ is a divalent hydrocarbon having from 1 to 10 carbon atoms and $n_{14}$ is an integer from zero to 3,

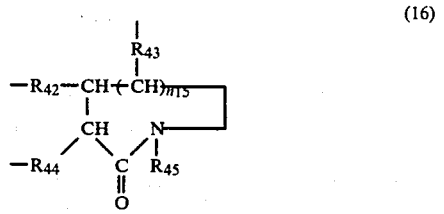
(16)

wherein $n_{15}$ is an integer from zero to 3, $R_{42}$ and $R_{43}$ are selected from the group consisting of hydrogen, divalent or monovalent hydrocarbon having from 0 to 10 carbon atoms and $R_{44}$ is selected from the group consisting of hydrogen, divalent or monovalent hydrocarbon having from 1 to 10 carbon atoms and only one of $R_{42}$, $R_{43}$ and $R_{44}$ must be a divalent hydrocarbon and attached to the Si atom, $R_{45}$ is selected from the group consisting of hydrogen, a monovalent hydrocarbon having from 1 to 10 carbon atoms and

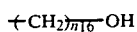     (5)

wherein $n_{16}$ is an integer from 2 to 4,

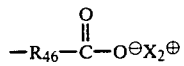     (17)

wherein $R_{46}$ is a divalent hydrocarbon having from 2 to 10 carbon atoms and the carbonyl group cannot be attached to a carbon atom alpha to the Si atom and $X_2^{\oplus}$ is a monovalent cation selected from the group consisting of monovalent metal cations and

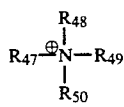

wherein $R_{47}$, $R_{48}$, $R_{49}$ and $R_{50}$ are the same or different and are selected from the group consisting of hydrogen and a monovalent hydrocarbon having from 1 to 10 carbon atoms,

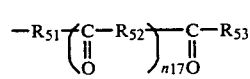     (18)

wherein $R_{51}$ is a divalent hydrocarbon having from 1 to 10 carbon atoms and the carbonyl group cannot be attached to a carbon atom which is alpha to the Si atom, $R_{52}$ is a divalent hydrocarbon having from one to 10 carbon atoms, $R_{53}$ is selected from the group consisting of hydrogen and a monovalent hydrocarbon having from 1 to 10 carbon atoms and $n_{17}$ is an integer from zero to 10, and

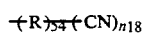     (19)

wherein $R_{54}$ is a hydrocarbon having from 1 to 20 carbon atoms and having a valence of $n_{18}+1$ and no —C≡N group is attached to a carbon atom of $R_{54}$ which is alpha to the Si atom and $n_{18}$ is an integer greater than zero;

(B) polymerized with comonomers selected from the group consisting of

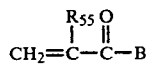     (1)

wherein $R_{55}$ is selected from the group of hydrogen and methyl and B is selected from the group consisting of

wherein $R_{56}$ is selected from the group consisting of hydrogen and a monovalent hydrocarbon having from 1 to 20 carbon atoms, $$-O-R_{57}(-OH)_{n_{19}}$$

wherein $R_{57}$ is a hydrocarbon having from 2 to 20 carbon atoms and a valence of $n_{19}+1$ and can have no more than one oxygen atom attached to any one carbon atom and $n_{19}$ is in integer greater than zero,

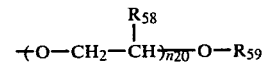

wherein $R_{58}$ is selected from the group consisting of hydrogen and methyl, $R_{59}$ is selected from the group consisting of hydrogen, a monovalent hydrocarbon having from 1 to 20 carbon atoms,

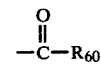

wherein $R_{60}$ is a monovalent hydrocarbon having from 1 to 20 carbon atoms and $n_{20}$ is an integer greater than zero,

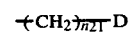

wherein $R_{61}$ and $R_{62}$ are the same or different and are selected from the group consisting of hydrogen, a monovalent hydrocarbon having from 1 to 20 carbon atoms and

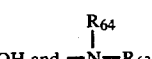

wherein D is selected from the group consisting of

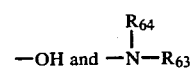

wherein $R_{63}$ and $R_{64}$ are the same or different and are hydrogens and monovalent hydrocarbons having from 1 to 20 carbon atoms and $n_{21}$ is an integer from 2 to 3,

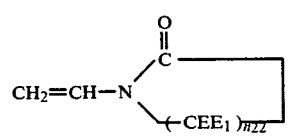     (2)

wherein E and $E_1$ are the same or different and are selected from the group consisting of hydrogen and a monovalent hydrocarbon having from 1 to 10 carbon atoms and $n_{22}$ is an integer from 2 to 5,

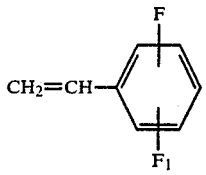
(3)

wherein F and $F_1$ are the same or different and are selected from the group consisting of hydrogen, a halogen, a monovalent hydrocarbon having from 1 to 20 carbon atoms, hydroxyl,

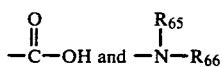

wherein $R_{65}$ and $R_{66}$ are the same or different and are selected from the group consisting of hydrogen and a monovalent hydrocarbon having from 1 to 20 carbon atoms,

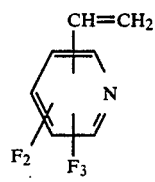
(4)

wherein $F_2$ and $F_3$ are the same or different and are selected from the group consisting of hydrogen and a monovalent hydrocarbon having from 1 to 10 carbon atoms,

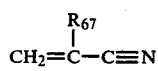
(5)

wherein $R_{67}$ is selected from the group consisting of hydrogen and methyl,

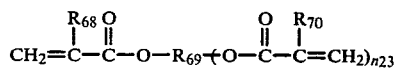
(6)

wherein $R_{68}$ and $R_{70}$ are the same or different and are selected from the group consisting of hydrogen and methyl, $R_{69}$ is a hydrocarbon having from 1 to 20 carbon atoms and a valence of $n_{23}+1$ and $n_{23}$ is an integer from 1 to 5,

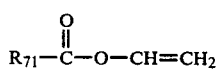
(7)

wherein $R_{71}$ is a monovalent hydrocarbon having from 1 to 20 carbon atoms and

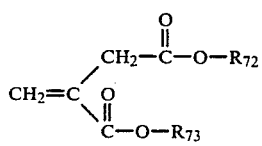
(8)

wherein $R_{72}$ and $R_{73}$ are the same or different and are selected from the group consisting of hydrogen and monovalent hydrocarbon having from 1 to 20 carbon atoms, (C) forming a polymer in a crosslinked network capable upon saturation with water of retaining from about 1 percent to about 95 percent by weight of water, based on the total weight of the polymer and water.

2. The contact lens according to claim 1 wherein said hydrophilic sidechain is selected from the group consisting of

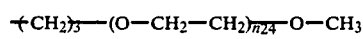

wherein $n_{24}$ is an integer from 2 to 3,

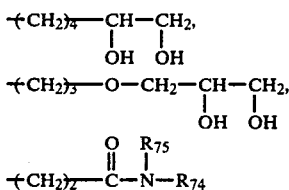

wherein $R_{74}$ and $R_{75}$ are the same or different and are seleced from the group consisting of hydrogen, methyl and —$CH_2$—$CH_2$—OH,

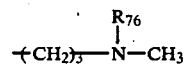

wherein $R_{76}$ is selected from the group consisting of hydrogen and methyl,

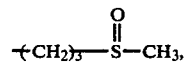

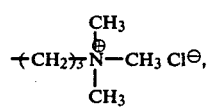

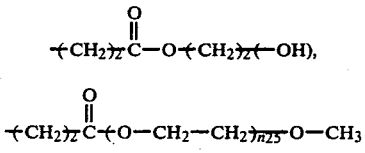

wherein $n_{25}$ is an integer from 2 to 3

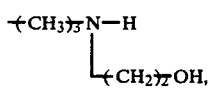

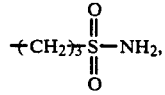

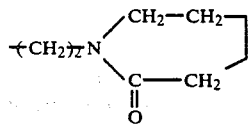

-continued

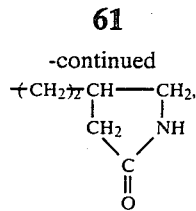

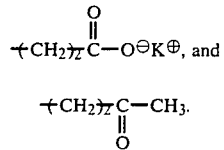

3. The contact lens according to claim 1 wherein X is selected from the group consisting of

wherein $n_{26}$ is an integer from 1 to about 10,

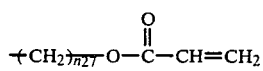

wherein $n_{27}$ is an integer from 1 to 10,

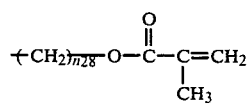

wherein $n_{28}$ is an integer from 1 to about 10 and

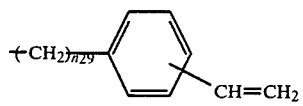

wherein $n_{29}$ is an integer from 0 to about 10.

4. The contact lens according to claim 3 wherein X is selected from the group consisting of

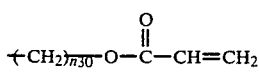

wherein $n_{30}$ is an integer from 3 to 4, and

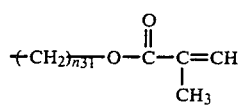

wherein $n_{31}$ is an integer from 3 to 4.

5. The polysiloxane monomer according to claim 4 wherein

wherein $R_{77}$ is selected from the group consisting of hydrogen and methyl.

6. The contact lens according to claim 1 wherein $Y_1$ is methyl and $Y_2$ is phenyl.

7. The contact lens according to claim 1 wherein $Y_1$ and $Y_2$ are methyls.

8. The contact lens according to claim 1 wherein at least one but not all of $Z_1$ through $$Z_7 \text{ is} + R_{78} + (CN)_{n32}$$

wherein $$R_{78} \text{ is} + CH_2 +$$

and $n_{32}$ equals 1.

9. The contact lens according to claim 1 wherein only one of $Z_1$, $Z_2$, $Z_5$ and $Z_6$ is a hydrophilic sidechain.

10. The contact lens according to claim 9 wherein a is equal to 1 to about 1,000, b is equal to zero, c is equal to 1, d is equal to 1 to about 1,000, e is equal to one and f is equal to zero.

11. The contact lens according to claim 10 wherein a is equal to about 10 to about 500, b is equal to zero, c is equal to 1, d is equal to about 10 to about 500, e is equal to 1 and f is equal to zero.

12. The contact lens according to claim 11 wherein a is equal to about 75 to about 150, b is equal to zero, c is equal to one, d is equal to about 25 to about 50, e is equal to one and f is equal to zero.

13. The contact lenss according to claim 12 wherein a is equal to about 75, b is equal to zero, c is equal to one, d is equal to about 25, e is equal to one and f is equal to zero.

14. The contact lens according to claim 13 wherein $Z_1$, $Z_2$ and $Z_5$ are methyls and $Z_6$ is selected from the group consisting of $$+CH_2\overline{)_3}(O-CH_2-CH_2\overline{)_{n33}}O-CH_3$$

wherein $n_{33}$ is an integer from 2 to 3,

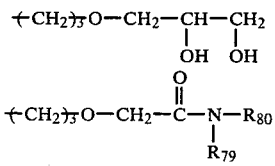

wherein $R_{79}$ is selected from the group consisting of methyl and hydrogen, $R_{80}$ is selected from the group consisting of methyl, hydrogen and —$CH_2$—$CH_2$—OH, $Y_1$ and $Y_2$ equal methyl and

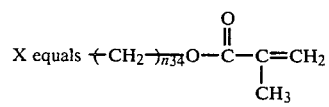

wherein $n_{34}$ is an integer from 3 to 4.

15. The contact lens according to claim 1 wherein only one of $Z_1$-$Z_7$ is a hydrophilic sidechain.

16. Th contact lens according to claim 15 wherein a is equal to one, b is equal to about 2 to about 4, c is equal to zero, d is equal to one, e is equal to about 25 to about 500 and f is equal to about 25 to 500.

17. The contact lens according to claim 16 wherein a is equal to one, b is equal to about 2 to about 3, c is equal to zero, d is equal to one, e is equal to about 25 to about 250 and f is equal to about 25 to about 250.

18. The contact lens according to claim 17 wherein a is equal to one, b is equal to about 2 to about 3, c is equal to zero, d is equal to one, e is equal to from about 50 to about 100 and f is equal to from about 50 to about 100.

19. The contact lens according to claim 18 wherein a is equal to one, b is equal to from about 2 to about 3, c is equal to zero, d is equal to one, e is equal to from about 50 to about 75 and f is equal to from about 50 to about 75.

20. The contact lens according to claim 19 wherein $Z_1$, $Z_2$, $Z_5$, $Z_6$, $Y_1$ and $Y_2$ are methyls, $Z_3$ and $Z_4$ are hydrogens and

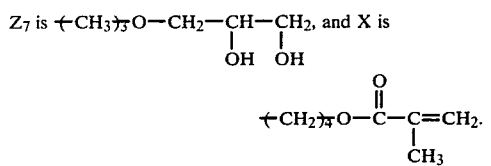

21. The contact lens according to claim 1 wherein the comonomer is

wherein $R_{81}$ is selected from the group consisting of hydrogen and methyl and B is —O—$R_{82}$ wherein $R_{82}$ is selected from the group consisting of a monovalent hydrocarbon having from 1 to 12 carbon atoms a monovalent hydrocarbon derivative having from 1 to 12 carbon atoms and hydrogen.

22. The contact lens according to claim 21 wherein $R_{82}$ is selected from the group consisting of hydrogen, methyl, ethyl, n-propyp, isopropyl, n-butyl and isobutyl.

23. The contact lens according to claim 21 wherein $R_{82}$ is selected from the group consisting of

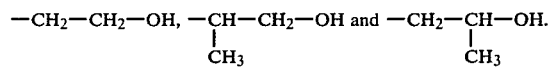

24. The contact lens according to claim 21 wherein $R_{82}$ is

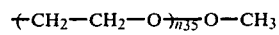

wherein $n_{35}$ is an integer from 1 to 3.

25. The contact lens according to claim 21 wherein

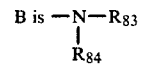

wherein $R_{83}$ and $R_{84}$ are the same or different and are selected from the group consisting of hydrogen, methyl and —$CH_2$—$CH_2$—OH.

26. The contact lens according to claim 1 wherein the comonomer is

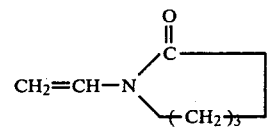

27. The contact lens according to claim 1 wherein the comonomer is

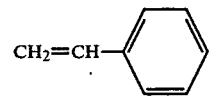

28. The contact lens according to claim 1 wherein the comonomer is

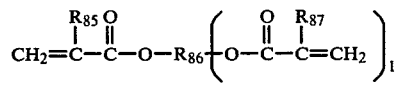

wherein $R_{85}$ and $R_{87}$ are the same or different and are selected from the group consisting of hydrogen and methyl and $R_{86}$ is —$CH_2$—$CH_2$—.

29. The contact lens according to claim 1 wherein the comonomer is

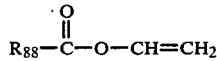

wherein $R_{88}$ is selected from the group consisting of methyl, ethyl, n-propyl and n-butyl.

* * * * *